United States Patent [19]

Schneider et al.

[11] Patent Number: 4,571,638
[45] Date of Patent: Feb. 18, 1986

[54] RANDOM-ACCESS ELECTRONIC CAMERA

[75] Inventors: Eric C. Schneider, Redwood City; Elaine Hebard, Los Altos; Stuart D. Rumley, Redwood City, all of Calif.

[73] Assignee: Datacopy Corporation, Mountain View, Calif.

[21] Appl. No.: 490,746

[22] Filed: May 2, 1983

[51] Int. Cl.[4] .............................................. H04N 1/10
[52] U.S. Cl. .................................... 358/293; 358/102
[58] Field of Search ........................ 358/293, 102, 903

[56] References Cited

U.S. PATENT DOCUMENTS

| 3,881,053 | 4/1975 | Lemelson | 358/102 |
| 4,196,450 | 4/1980 | Miller et al. | 358/903 |
| 4,271,430 | 6/1981 | O'Brien | 358/102 |

Primary Examiner—Howard W. Britton
Assistant Examiner—John K. Peng
Attorney, Agent, or Firm—Owen L. Lamb

[57] ABSTRACT

A self-scanning linear array (10) is moved (12) in the image plane of a lens to thereby scan the image of an object which has been focused in the image plane. A random access controller controls random access to the information within the scanned image. Commands (14) including mechanical positional parameters (16) and electronic scan parameters (18) are decoded by the master microprocessor (20). The electronic scan parameters in the command provide information such as a user selected transverse axis frame size scan output of the array. An address generator (22) generates addresses in response to output pulses from the array. A windowing sequencer (24) in conjunction with the address generator (22) selectively gates particular ones of the pulses in the train of output pulses from the array in accordance with the electronic scan parameters in the command. The positional parameters (16) in the command provide information as to a user selected mechanical position of the array such as longitudinal axis frame size and longitudinal position axis seek. A position indicator (26) generates position representations in response to the physical position of the array (12), and a servo loop including slave processor (28), detents the array at the position representation corresponding to the selected mechanical position of the array as specified in the command decoded by the master microprocessor (20).

14 Claims, 36 Drawing Figures

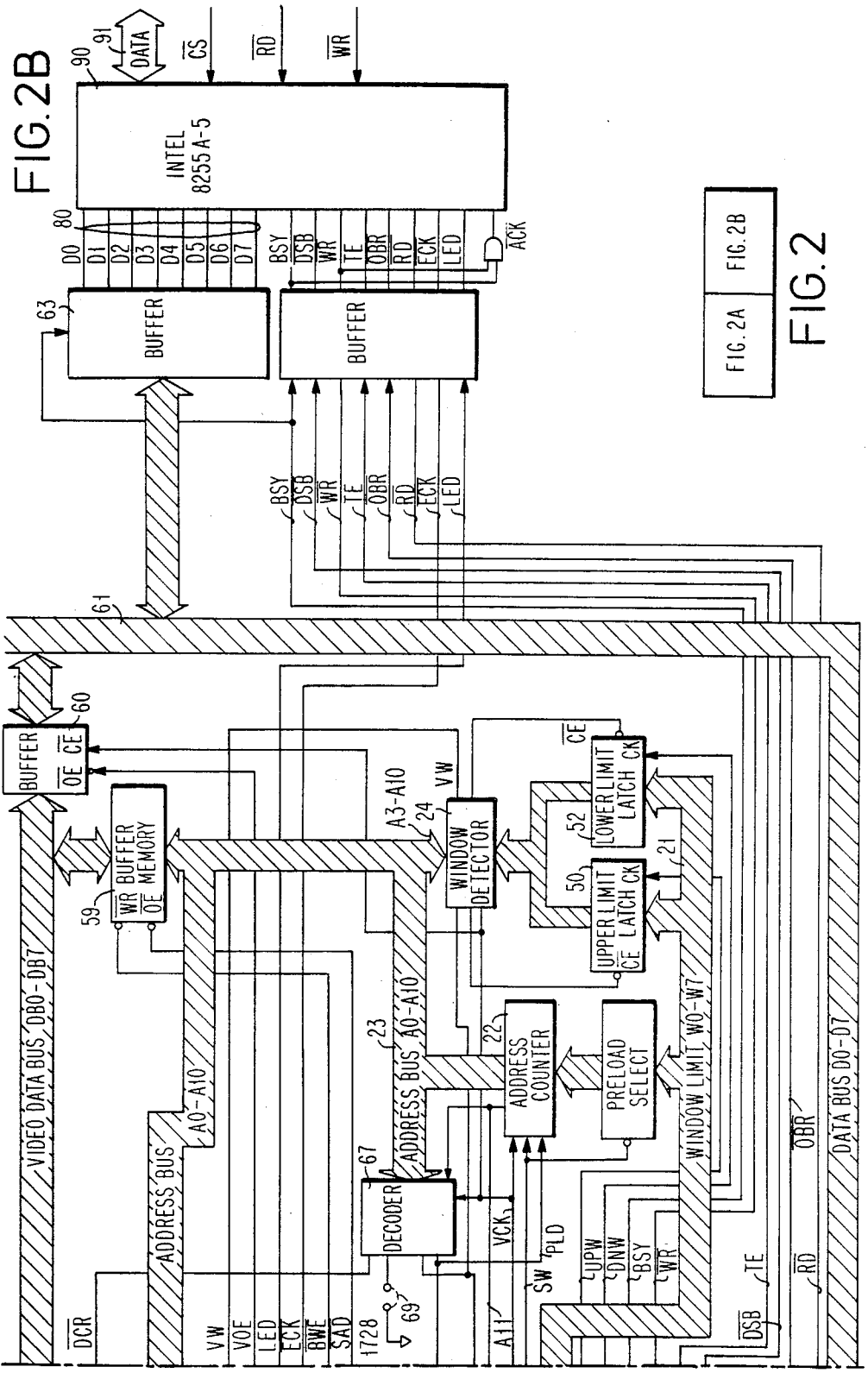

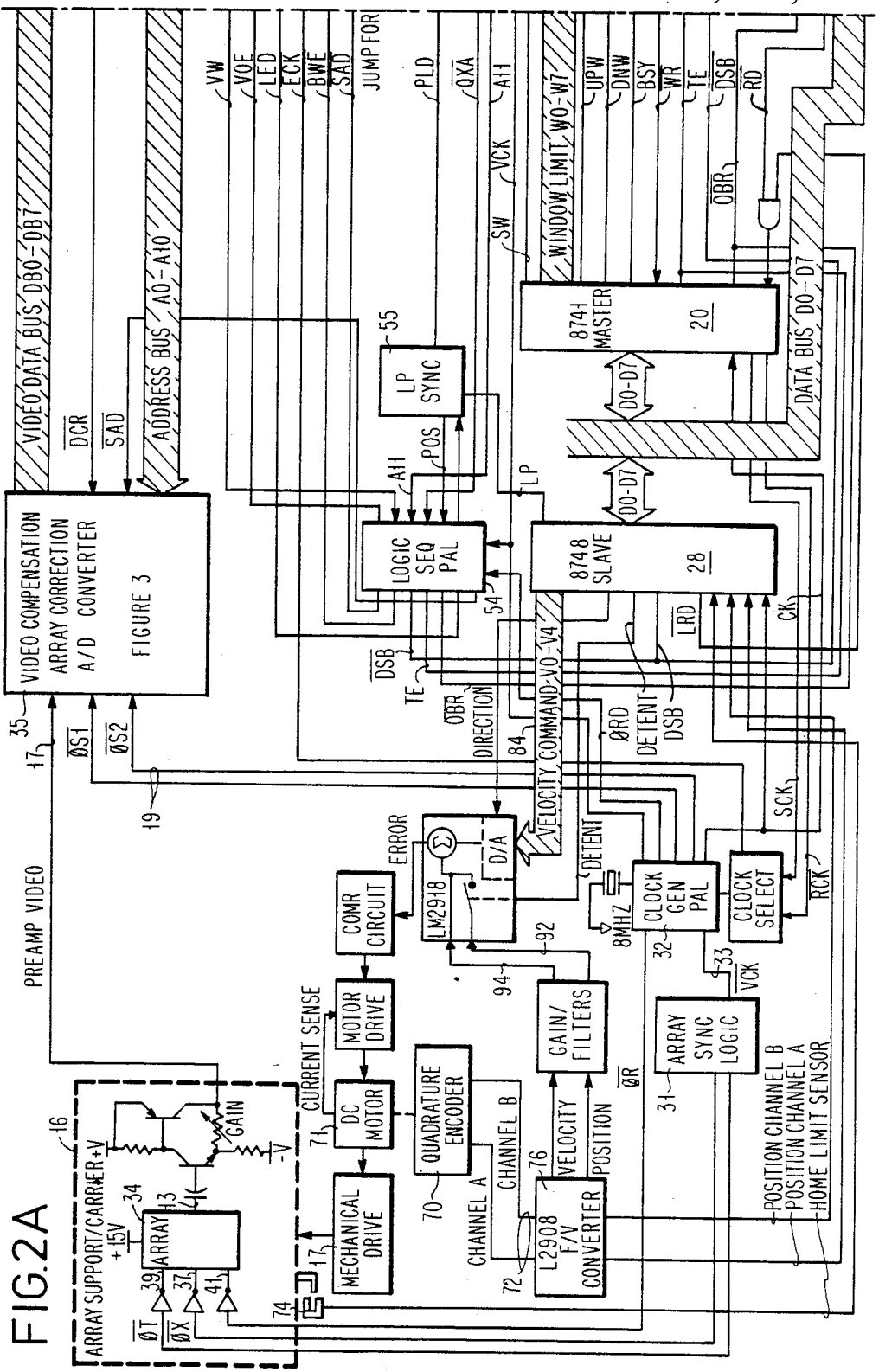

FIB.4C

RANDOM-ACCESS ELECTRONIC CAMERA

BACKGROUND OF THE INVENTION

1. Field of the Invention

The invention relates to image processing and more particularly to a method and apparatus for the capture and digitizing of an electronically-scanned image.

2. Description of the Prior Art

In U.S. Pat. No. 4,196,450, which was granted to Armin Miller and Maxwell G. Maginness on Apr. 1, 1980, there is described a selective copying apparatus. In that apparatus a hand-held scanner is used by an operator to scan a selected portion of a document by placing the scanner at a desired line position and moving the scanner across the document. The scanned image is converted into digital data. The digital data is in a form which can be processed by a microprocessor and manipulated by input/output devices such as a CRT display and a printer. It is, however, necessary that the hand-held scanner be in contact with the object being scanned in order that the mechanical scan operation can be synchronized with the electronic scan of a photodiode array within the scanner.

To provide for noncontact image scanning, the Datacopy Series 300 high-resolution digitizing cameras were developed by Datacopy Corporation of Mountain View, Calif. A Series 300 camera may be used as a digitizer to capture images of alphanumerics, graphics, and two-dimensional or three-dimensional objects. The Series 300 camera focuses the image of an object to be scanned on the image plane of the camera. The camera's optical system is held stationary while a self-scanning linear array, comprised of a row of light-sensitive devices, is moved a measured distance in the image plane. The linear array is continuously clocked as it is moved along the image plane. The resulting video signal output is a train of pulses, each proportional in magnitude to the light intensity falling on the corresponding light-sensitive device at the time it is sampled. The output of the array is utilized at sequential position intervals of the array as the array is moved in the image plane, to thus provide a video output line scan in two dimensions of the image focused at the image focal plane.

In the Series 300 camera, the scanning and digitizing functions are performed automatically. That is, the camera electronics control the mechanical movement of the array and synchronizes the electrical scanning of the light-sensitive devices. In order to provide for a wider range of system applications, it is desirable to have a digitizing camera in which the mechanical and electrical scanning functions can be controlled by commands from a host computer; for example, through a peripheral interface adapter (PIA) available from semiconductor manufacturers. These interfaces are typically parallel interface devices available on microcomputers and microcomputer development systems. The PIA is thus used in conjunction with a microprocessor for commanding the camera operations and requesting status from the camera, just as if the camera were a conventional input/output device such as a a disk, drum, tape drive, etc.

SUMMARY OF THE INVENTION

It is a primary object of this invention to provide a digitizing camera system wherein mechanical and electrical functions of the camera are commandable over a user interface.

Briefly, the invention is embodied in a random-access controller for controlling random access to information within a scanned image. The controller includes first means for receiving commands which include mechanical position parameters and electronic scan parameters. The commands are decoded to produce command signals which are used to control the mechanical position of a scanning array and to control the electronic scanning functions of the array, in accordance with the positional parameters and the electronic scan parameters in the received command.

The invention has the advantage that the size of the scanned image can be varied, the point at which the scan begins and ends can be varied, the scan rate can be controlled, position seek operations can be performed, and the camera can be commanded to operate in a free scan or a multiscan incremental mode.

The foregoing and other objects, features, and advantages of the invention will be apparent from the following more particular description of a preferred embodiment of the invention as illustrated in the accompanying drawings.

BRIEF DESCRIPTION OF THE DRAWINGS

FIGS. 2A and 2B when placed together as shown in FIG. 2C comprise a more detailed block diagram of the random-access controller portion of FIG. 1;

FIGS. 4A–4L are flowcharts of microprogramming for the master microprocessor shown in FIGS. 1 and 2A;

DESCRIPTION

Figure 1:
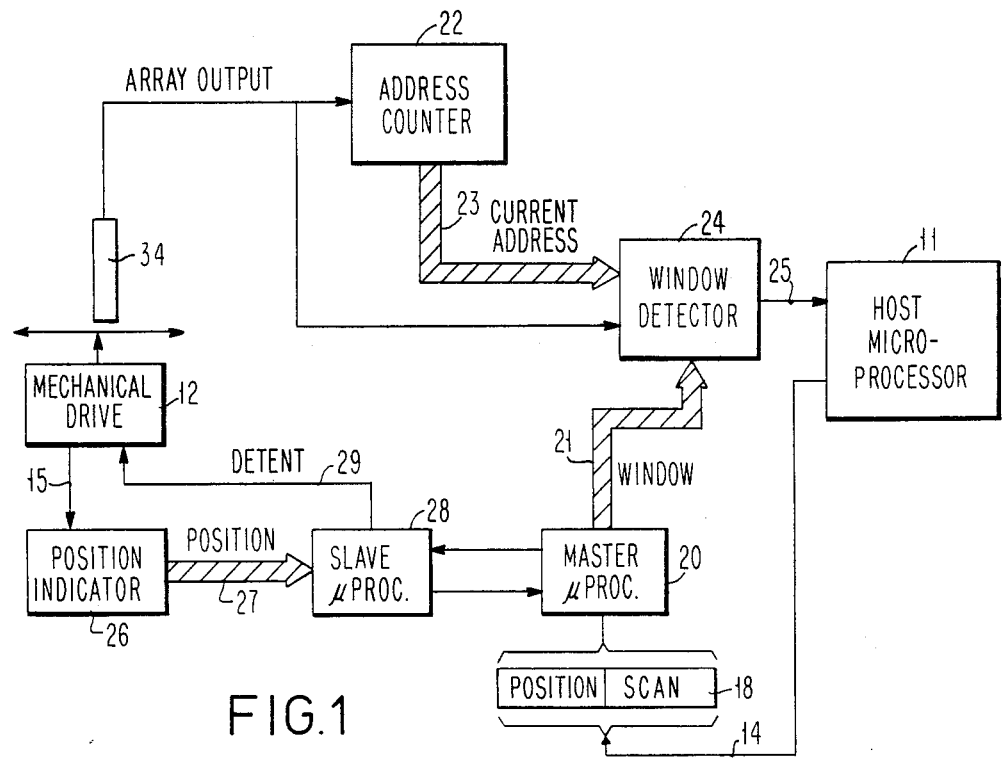
FIG. 1 is an overall block diagram of an image-processing system in which the present invention is embodied.

Referring now to FIG. 1, the overall image-processing system in which the invention is embodied will now be described. The camera system for capturing images is comprised of a photodiode array of light-sensitive devices (34) and a mechanical drive system (12) which moves the array longitudinally while the photodiodes in the array are electronically scanned in the vertical direction. The photodiode array and mechanical parts of the camera are more fully described in International Publication No. WO 81/00944 of Charles A. Lindberg titled "Electronic Camera Employing a Solid-State Image Sensor," published on Apr. 2, 1981 and assigned to the assignee of the present invention, Datacopy Corporation, which publication is hereby incorporated by reference.

An external host microprocessor (11) supplies commands (14) which include position parameters (17) and scan parameters (18). These commands are supplied to a master microprocessor (20) which controls a slave microprocessor (28). Acting upon the information contained within the command (14), the master microprocessor commands a vertical frame size or window. The window is defined symmetrically or indirectly by commanded window boundaries, which may be symmetrical or asymmetrical. The windowing operates as follows. An address counter (22) is clocked under the control of the clock generator PAL (32) and generates sequential addresses to thereby provide a current address (23). The current address (23) and the array output pulses (13) are supplied to a windowing detector (24). When the window address and the current address are equal, a pulse is generated by the windowing detector (24) at the video output (25) to the microprocessor. Thus, the vertical frame size can be varied under control of the user.

The longitudinal frame size is controlled as follows. The position portion (17) of the command (14) is decoded and utilized by the master microprocessor to control the slave microprocessor (28). A position indicator (26) generates position representations corresponding the actual mechanical position (15) of the array in the longitudinal direction. Using the current position signal (27), the slave microprocessor generates a detent signal (29) which controls mechanical drive (12) to detent the array at any position commanded by the user.

Referring now to FIGS. 2A and 2B, the details of the random-access controller shown in FIG. 1 will now be described. As shown and described in the above-referenced International Publication No. WO 81/00944, the camera mechanism is attached to a frame. A standard lens housing is connected to the frame such that the lens can be moved for focusing. An array carrier (16) is slidably mounted on the frame (by means of upper-support and lower-support shafts. The array carrier (16) is driven back and forth in the horizontal (longitudinal) direction on the support shafts by means of a motor-driven helical-threaded drive shaft which is driven by a motor which drives a toothed belt to turn the drive shaft.

Attached to the array carrier is an image sensor (34). The image sensor is held in an array/support removable holder (not shown). The image sensor is comprised of an array of light-sensitive devices, such as, but not limited to, one or more rows of photodiodes. As the carrier (16) moves throughout the length of its travel along the support shafts, the image sensor (34) travels horizontally in the image plane.

The solid-state image sensor comprises a shift register which is driven by a clock, such that each scan is initiated by a start pulse. The start pulse loads a bit which is clocked through the register, successively opening and closing switches and thus connecting each photodiode, in turn, to a video output line. As each photodiode is accessed, its capacitance is charged to the potential of the video line and is left open-circuited until the next scan. During the interval between scans, the capacitor is discharged by an amount equal to the instantaneous light-responsive photocurrent in the diode, integrated over the line scan. Each time a diode is sampled, this integrated charge loss must be replaced through the video line. The resulting video signal is a train of charge pulses, each proportional in magnitude to the light intensity falling on the corresponding photodiode.

A standard 35 mm film camera image field is approximately 1 inch by 1.5 inches in size at the focal plane. The self-scanning photodiode array (34) is 1 inch in length and is placed crosswise to long dimension of this field. The array is moved through the 1.5-inch length at a constant rate of travel or in fixed increments by means of the motor (71) shown in FIG. 2A. The motor shaft has a position encoder thereon, such that the diode array self-scan output may be sampled at appropriate position intervals. This results in a two-dimensional electronic image of the 1-inch by 1.5-inch focal plane visual image. A home-limit sensor switch (74) is provided to sense when the carriage is at the extreme mechanical limit of its travel.

Briefly, the logic of FIGS. 2A and 2B operates as follows to capture images from objects scanned by the camera. The scanning cycle of the linear array and the synchronization of the control circuitry is provided by a basic clock generator (32). The CLK output (33) from the clock generator is a timing pulse which is utilized by circuits to provide the appropriate synchronizing pulses for the transfer of digital data to an external microprocessor.

As described more fully in the above-referenced International Publication No. WO 81/00944, each scan of the shift register is initiated by a start scan pulse, reset pulse (41). The start pulse loads a bit which is clocked through the register, successively opening and closing the switches, thus connecting each photodiode in turn to the array output (13).

The slotted aperature of the array and the array's linear photodiode geometry allows image slices to fall on the surface of the array's 1728 (or 2048) photodiodes. After an appropriate integration time, the incident light has created a time/illumination-intensity proportional electron charge packet. This charge packet is transferred to an analog shift register internal to the array device.

The first clock $\overline{O}_R$, is required to reset the accumulated charge voltage on the charge detector. The second clock, $\overline{O}_X$, is applied to the array's transfer gate to move the accumulated charge packet from the image sensor elements to the CCD transport shift registers. The third clock, $\overline{O}_T$, is applied to the gates of the analog shift registers to move the charge packets from the image sensor elements to the gated charge-detector/amplifier. Under the periodic influence of these clocks, the charge packets are transferred out of the array into the video preamplifier.

The video preamplifier circuit is an AC-coupled, variable gain, bandpass filter designed to suppress low frequency noise (1/f) and amplify the video signal to match the range of the compensation circuitry. The output (17) of this filter is labeled PREAMP VIDEO.

Figure 3:
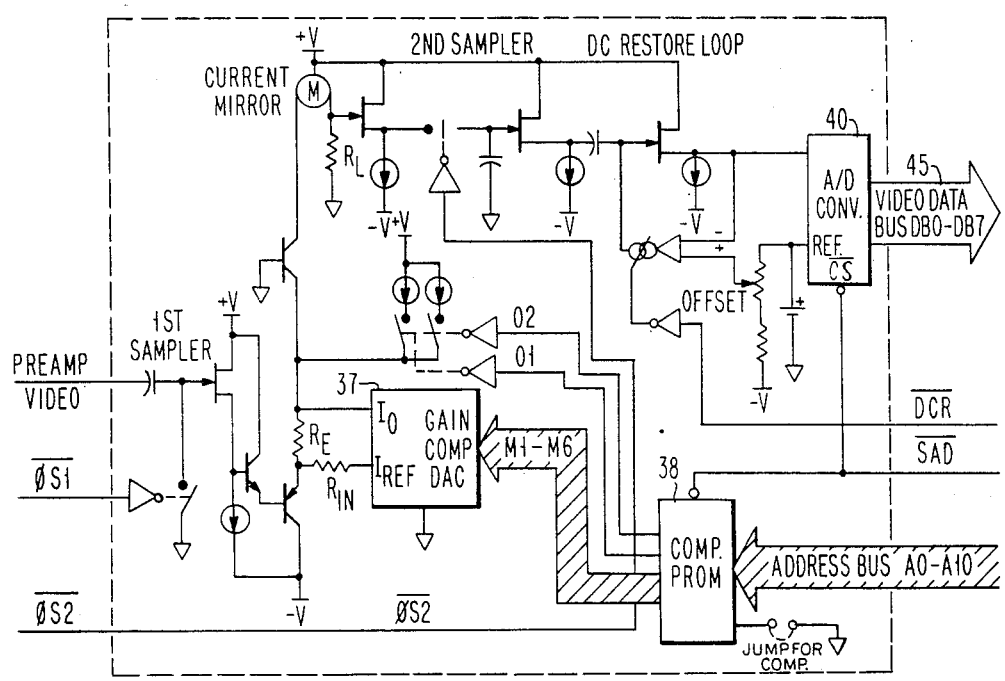
FIG. 3 is a more detailed block diagram of the video compensation, array correction, and A/D converter circuits of FIG. 2A.

The video signal (17) is applied to circuit (35). Refer to FIG. 3. The signal (17) passes through the 1ST SAMPLER, which DC restores its output at the video pixel rate (standard 500 kHz), essentially removing all 500 kHz components and any super harmonics.

The sampled video signal is transferred to the camera's video compensation circuit (37). This circuit alters the analog video signal to compensate for the array's inherent pixel response nonuniformity (PRNU). The compensation method employed appears as:

$$y = [K(A - \tfrac{1}{2}) + 1]x$$

where:
  y = compensated video
  K = photodetector maximum PRNU
  A = compensation memory, pixel responsivity dependent, gain correction word x = input video $$[A] = M\frac{1}{2} + M2/4 + M\frac{3}{8} \ldots M6/64$$

$$M_n = 1,0$$

The $\phi 1$ and $\phi 2$ signals from COMP. PROM (38) control current sources allowing the addition of offset in the implementation of compensation. The COMP. PROM (38) holds the correction values for the particular array in the camera.

The resultant video output of this compensation circuit is synchronously clocked into the 2ND SAMPLER stage. This stage is a sample-and-hold circuit designed to hold the video stable during digitization. This video is DC restored at the pixel rate by the synchronous clock, DCR. The time-illumination proportional signal is now ready for digitization.

The digitizing process is performed either as a standard, linear, eight-bit quantization or, optionally, as a single-bit, constant threshold comparison. The eight-bit analog-to-digital conversion is initiated by the $\overline{O}_{s1}$, $\overline{O}_{s2}$ clock times (19) of the clock generator circuit and produces a one of 256 gray-level result. The resultant, quantized video signal is gated onto the video data bus (45) during valid scan conditions by the SAD signal. This signal is generated as a result of the microprocessor having decided that the array is correctly positioned and the window detector circuit (24) determining that the pixel in question is within the desired image window.

The buffer memory (59) is used to hold pixel data should the user desire to clock out video at a rate less than the standard 500 kHz rate. The array video gated on the video data bus enters the buffer memory (59) and is stored using the BWE signal generated by the same PLA logic (54) that created the SAD signal. The output enable signal (OE) for the buffer memory is implemented when the user is clocking data out at the slow rate.

The data-bus buffer (60) allows video data from either the A/D converter (40) or from the buffer memory (59) to be gated onto the microprocessor common data bus (61) for transfer to the user. This buffer (60) is gated using the 500 kHz pixel clock and the valid window signals.

The clock-generation (32) and array-synchronization (31) circuits are used to generate the variety of clock signals required by the circuitry. The microcomputer clocks are supplied by these circuits as the array and video data clocks. These circuits control the rate at which data leaves the camera dependent upon which data mode the user has selected. The SCK and RCK lines from the master processor are used to gate and source, respectively, the buffer memory data transfer clock.

The LP SYNC circuit (55) generates a signal called POS, which signifies that the array is in a valid imaging position. The source for this decision is the slave-microcomputer's LP line. This is a pulse generated each time the slave decides that an image may be taken based upon array position.

The logic-sequence circuit (54) is used to control the flow of data into and out of the A/D converter (40), buffer memory (59), and the internal data-bus buffer (60). By combining longitudinal-axis information (POS) with transverse-axis information (VW) indicating a valid array window and clock sources, this logic controls the presentation of data to the final, external data buffer (63). The data clock DSB transverse enable (TE) and longitude enable (LED) interface signals are also generated by the circuit (54). The DSB signal is used to clock data into the interface (90). The LED signal indicates that a scan is in progress while the TE signal indicates that an image slice is being scanned.

The decoder circuit (67) is a comparator which monitors the pixel count address (23) to decide when to issue the array-restart and video DC-restore signals. The 1728 jumper (69) notifies the circuit of the array type currently in the camera.

The address-counter circuit (22) consists primarily of counter circuitry whose output is incremented synchronously with each pixel's video signal. The address output (23) is used by the compensation circuit's data storage (EPROM) to properly apply the correct compensation data to the corresponding pixel video.

The address output (23) is also used by the window detector (24) to decide whether the currently-available pixel data occurs within the user-requested frame. If so, the VW signal is produced notifying the logic sequencer (54) of that fact. The window detector is given window definition data by the controller which is latched into the upper-limit latch (50) and lower-limit latch (52). The frame data is based upon the requested frame size by the user (in increments of 16 pixels) and is symmetrical about the array's center-of-scan position.

The controller section consists of two, single-chip microcomputers, an Intel 8741H (master) and an Intel 8748H (slave). The main function of the master processor (20) is to interface to the user, accept and interpret commands, issue status, and issue commands to the slave processor. The master processor loads and latches the window data, controls the data clock source, and generates some of the interface signals as described. The slave processor (28) is primarily dedicated to the control of the array servo. It moves the array to desired positions, detects travel limits and, secondarily, runs the camera's self-diagnostics.

Refering now to FIG. 2A, the array is mounted on a carrier (16) which is, in turn, mounted in a slider frame. The carrier is moved along the longitudinal axis by a drive mechanism (17) driven by a motor (17). The motor armature shaft has an optical encoder disk (70) providing a two-channel quadrate signal pair (72) channel A and channel B, representing motor shaft position and, therefore, array position. These signals are used by the servo as the feedback element for velocity estimation. A positive or negative phase relationship between the signal pair determines the arithmetic sign of that estimation.

The servo loop performs in a bimodal form of operation. The controller will open the position-seeking servo loop when initiating an excursion and leave only the velocity closed loop intact. Then, following a velocity-position profile stored in memory in the slave microprocessor (28), the controller will command the servo to move the array to within 0.81 um of its final position. The controller monitors the array position by counting the digital representations of the quadrature signal pair and incrementing or decrementing its position count according to the same phase relationship used by the velocity loop itself. Upon reaching the 0.81 um position point, the controller closes the position-seeking servo loop. This now provides a detent position loop around the existing velocity loop. The controller commands a zero velocity to the inner loop and the servo now seeks an effective zero position at zero velocity.

The position feedback element is provided by the channel A signal of the quadrature pair (72). The detent position is represented as this signal's 0.0 VDC crossover point.

The advantage of a bimodal servo is one of high excursion rates at low position overshoot. If a position loop were always intact, the overshoot would commonly be greater than an entire 13 um image slice when making a multislice excursion. When controlling velocity, however, the controller reduces the commanded position excursion under the position loop influence and carefully controls position loop entrance velocity.

Upon power-up, or commanded reset execution, the controller initially commands the servo to detent at its current position. Then, after restoring registers, setting default conditions, and performing all other initialization operations, the controller commands the array to move, under velocity control, slowly into the home-limit sensor area (74). This establishes a one-time reference position. The controller then moves the array away from the sensor toward the active frame region, counting position pulses as it moves. After completing this required offset excursion, the array is detented in its home position. In the camera of the present invention, therefore, the home position is accurate to within 0.81 um (1/16 of an image slice) and not prone to the home position nonrepeatabilities of prior art cameras.

The user commands the camera to perform various functions via the bidirectional data bus (80) of the camera interface shown in FIG. 2B. The camera interface may be attached to the host microprocessor (11) of FIG. 1 by means of an Intel 8255A-5 Programmable Peripheral Interface (90), which is a general purpose programmable I/O device designed for use with microprocessors.

When the BSY interface line is not active, the camera is in a listen mode and ready to receive commands. By placing command data (single or multibytes) on the data lines (80) and strobing the WR interface line, the user transmits to the controller its desired commands. The commands are listed and described below under the heading "Command Summary."

Figure 8:
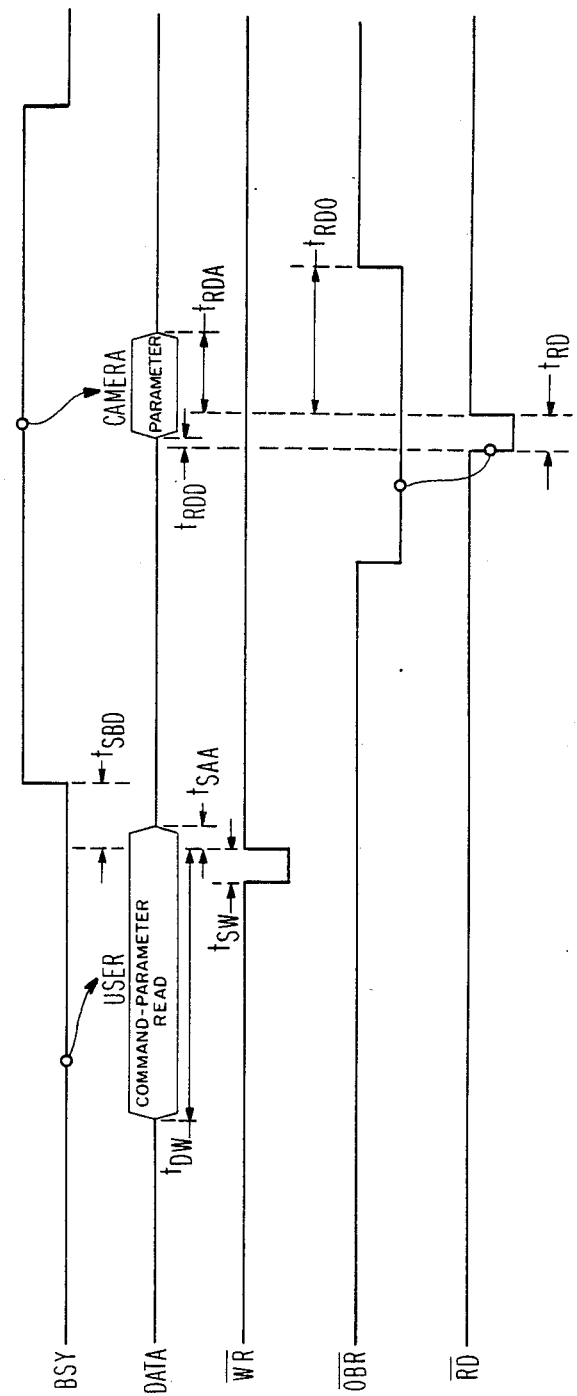
FIG. 8 is a timing diagram of the command write/parameter read modes of operation.

If the data lines are held in a tri-state (high impedance) state, and the WR line is toggled, the camera interprets this as a command to scan according to currently-held default scan parameters. These default scan parameters are either the power-up parameters or the most recently commanded parameters. The WR line is used to latch all command and parameter data into the camera. (See timing diagram, FIG. 8.)

Figure 6:
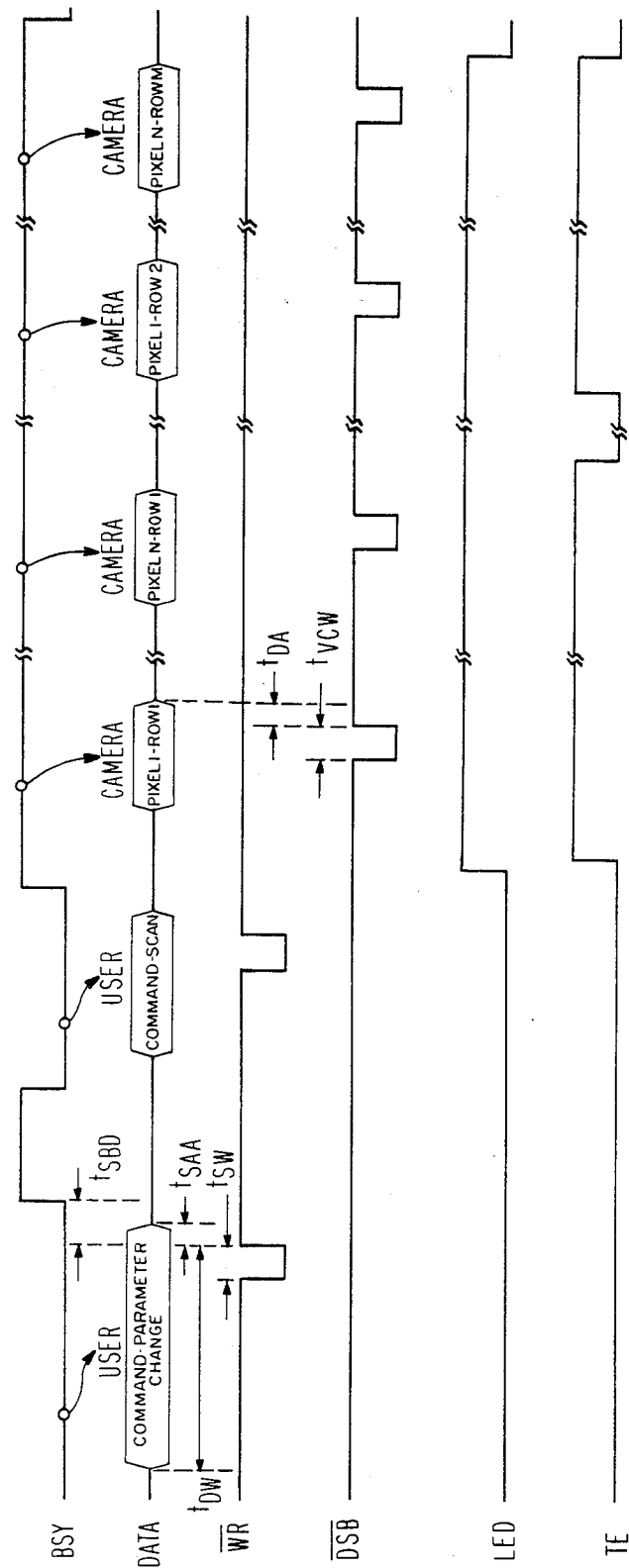
FIG. 6 is a timing diagram of the free-scan/multiscan incremental modes of operation.

In order to retrieve the video data from the camera, the user monitors the interface differently depending on his mode of operation. If the user requested a free-scan mode, or multiscan incremental (more than one detented line) mode of operation, the data is sent in a parallel format (8 bits) without any clocking on the part of the user. As the data is valid on the data lines of th interface, the DSB clock line will toggle, clocking the digital image into the user's buffer. The BSY line is active during this operation. (See timing diagram, FIG. 6.)

Figure 7:
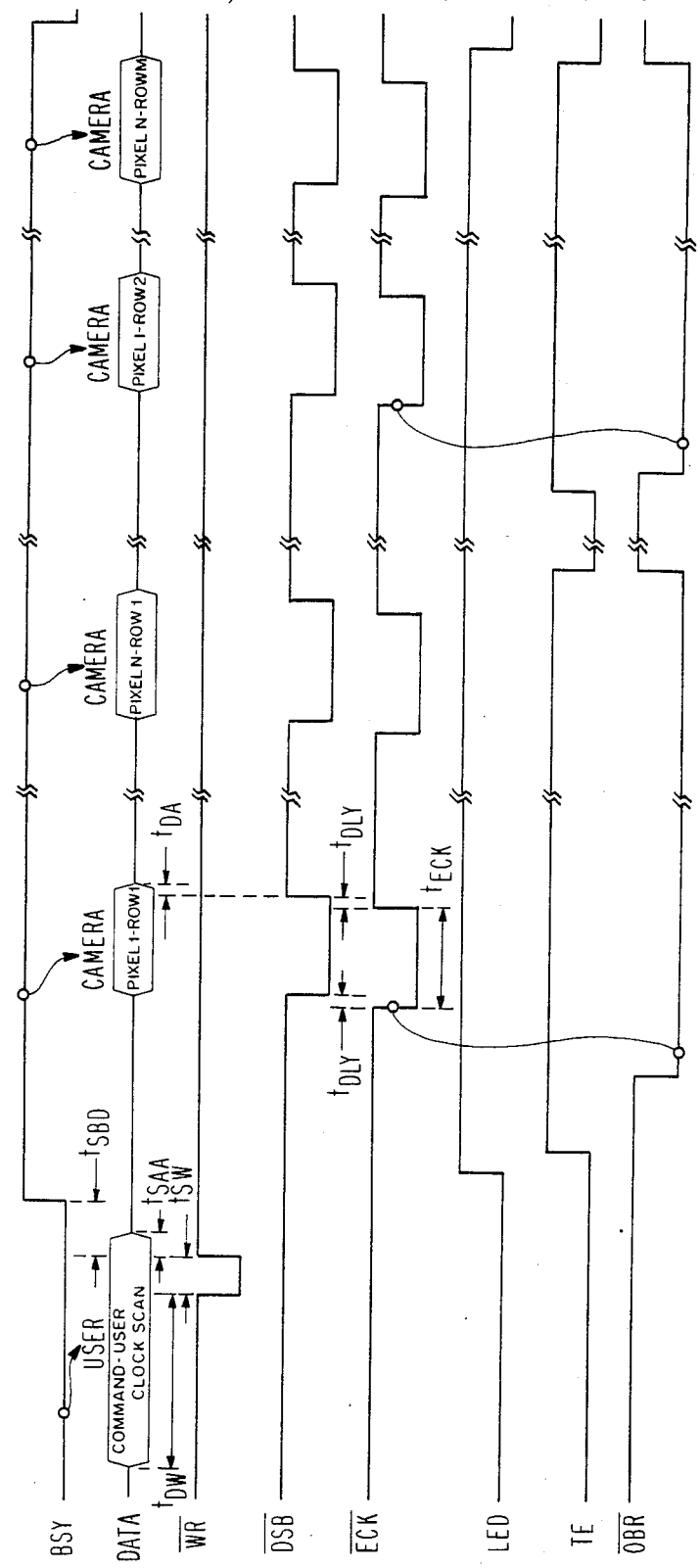
FIG. 7 is a timing diagram of the user-clocked buffered incremental scan mode of operation.

If under the incremental mode (single line) and the camera's 2048 element buffer (60) is utilized, and the user may clock out the data, one byte at a time, as slowly as he wishes. This is performed by the user toggling the ECK clock input line. The user may also choose to have the camera clock out the data at a fixed 20 kHz rate, one image line at a time. (See timing diagram, FIG. 7.)

COMMAND SUMMARY

1. Scanning/Array Motion

A. Frame Scan

Code=FF

The currently-defined frame is digitized, from start position to end position. The maximum potential distance is 3200 scan lines, each line taken 13 microns apart. The pixel video data is clocked out to the user, one line at a time, at a rate of 500 kHz (optionally 2.0 mHz). The rate of array motion is defined by the maximum velocity parameter.

B. Seek Position "N"

Code=C3 XX XX

A two-byte value (XX XX) is expected by the controller representing the desired position of the array. The first byte following the command code is expected to be the most significant byte of the desired position immediately without video scans occurring. Maximum "N" value is 3200 (decimal). The position (XX XX) is in a hexadecimal format.

C. Scan to Position "N"

Code=C6 XX XX

The optical image is scanned in a frame scan mode from the current array position to position "N" (XX XX), where the first byte following the command code is expected to be the most significant byte of the desired scan termination position. The maximum allowable "N" is 3200 (decimal). The position (XX XX) is in a hexadecimal format.

D. Incremental Scan (1) Automatic Mode

Code=F2

The transfer of each image line (size defined by window command) is separated by a time delay which varies according to the value of the delay-scaler parameter. The array is moved incrementally across the image and the data rate is 500 KHz (optionally 2.0 MHz) during a single image line scan.

(2) Controller Mode

Code=F5

Each image line of data is clocked out of the video buffer by the internal controller. The buffer is filled as in the Automatic mode above, but the data rate is reduced to 20 KHz during the image line scan.

(3) User Mode

Code=F4

As each image line is incrementally scanned, and the associated data stored in the line buffer, the interface signal "OBR" is activated to notify the user that data is available. The user may then clock out the data using the "ECK" signal. The adjacent image line will not be scanned until the line buffer is empty, although the array will be in the adjacent image line position.

2. Parameter Modification

A. Set Start Position

Code=A1 XX XX

The frame scan start position is modified with the most significant byte of the new starting location immediately following the command code. The maximum allowable value is 3200 (decimal). The position (XX XX) is in a hexadecimal format.

B. Set End Position

Code=A2 XX XX

The frame scan end position is modified with the most significant byte of the new ending location immediately following the command code. The maximum allowable value is 3200 (decimal). The position (XX XX) is in a hexadecimal format.

C. Set Window Size

Code=A3 XX

The window height is defined as the byte following the command code (times 16). The window is symmetrical about the center of the transverse axis.

D. Set Maximum Velocity

Code=A4 XX

The scan velocity of the array is modified to the data byte following the command code. This feature is designed to give limited, frame scan control over the rate at which image lines are digitized. The allowable range is from 6 to 16 (decimal). If further speed reductions are required, use of the incremental scan modes is recommended. The speed data (XX) is expected in a hexadecimal format.

E. Set (upper) Window Boundary

Code=A6 XX XX

The upper boundary of the Window frame is defined as the 2 bytes following the command code (times 8). The maximum allowable value is determined by the array size (1728 or 2048).

F. Set (lower) Window Boundary

Code=A7 XX XX

The lower boundary of the window frame is defined as the 2 bytes following the command code (times 8). The maximum allowable value is determined by the array size (1728 or 2048).
NOTE: When the upper boundary entry is less than the defined lower boundary, they will be exchanged with one another by the controller. If the upper=the lower, a soft error will be signaled.

G. Set Delay Scaler

Code=C4 XX

The time delay parameter for the incremental scan modes is modified. Each of the possible 255 data values represent a 1900 microsecond giving a maximum delay of 484 milliseconds.

3. Parameter Read Operations

A. Read Start Position

Code=B1

Two bytes of data, representing the current start-of-frame position, are transmitted, one byte at a time, most significant byte first.

B. Read End Position

Code=B2

Two Bytes of data, representing the current end-of-frame position, are transmitted, one byte at a time, most significant byte first.

C. Read Window Size

Code=B3

Two bytes of data, representing the current, window size (divided by 8), are transmitted one byte at a time, most significant byte first.

D. Read (upper) Window Boundary

Code=B6

Two bytes of data, representing the current upper boundary (divided by 8) are transmitted one byte at a time, most significant byte first.

E. Read (lower) Window Boundary

Code=B7

Two bytes of data, representing the current upper boundary (divided by 8), are transmitted one byte at a time, most significant byte first.

F. Read Maximum Velocity

Code=B4

A single byte of data, representing the current, maximum scan velocity is transmitted.

G. Read Delay Scaler

Code=B5

The time delay parameter for the incremental scan modes is transmitted as a single byte (0–255) with each value in units of 1900 microseconds.

4. Reset

Code=C2

A. Start Position: 50
B. End Position: 2250
C. Window Size: 1728 (optionally 2048)
D. Maximum Scan Velocity: 16
E. Delay-Scaler: 40 (76 msec.) Interface The following is a description of the camera interface.

| Signal Mnemonic | Title | Source | Description |
|---|---|---|---|
| DATA STRB | DATA STROBE | camera | This signal drops low as valid video or status data is being put on the interface from the camera. The rising edge should be used as the latching signal for data. |
| LED | LONGITUDE ENABLE | camera | This signal signifies that a scan is in progress. LED is different from BSY in that it will not be |

-continued

| | | | active during command recognition. |
|---|---|---|---|
| OBR̄ | OUTPUT BUFFER READY | camera | This signal signifies that status data is present in the camera and ready to be strobed out under control of the RD line. |
| STRĀ | COMMAND STROBE | USER | This signal is issued by the user to latch command data into the camera. The rising edge latches the data. |
| TE | TRANSVERSE ENABLE | camera | This signal occurs once during each "image slice" output and is active during the entire "slice". |
| RD̄ | READ | USER | This signal is issued by the user to read status data out of the camera. The rising edge should be used to latch the data. |
| VIDEO CLK | VIDEO CLOCK | camera | Normally free-running 500 kHz clock used as a video storage and address counter clock source. May be user-timing dependent only in the incremental-user clocked mode. Runs at 20 kHz in the incremental clock mode. |
| ECK̄ | VIDEO DATA STROBE | USER | This signal is driven by the user to clock out the video data collected under an incremental user clock mode. Active on the rising edge. |
| WR̄ | COMMAND STROBE | USER | This signal is issued by the user to latch command data into the camera. The rising edge latches the data. |
| DATA | DATA BUS | camera/ USER | Bidirectional 8-bit data bus whose direction is controlled by the busy interface line. When busy is active, the user shall be in a data reception mode. |
| BUSY | CAMERA BUSY | Camera | This signal signifies that the camera is controlling the data bus at the interface. |

| Timing Specifications (at interface connector) | | | |
|---|---|---|---|
| Designation | Minimum | Maximum | Units |
| $t_{SBD}$ | 2.0 | | usec |
| $t_{SAA}$ | 0 | | nsec |
| $t_{SW}$ | 300 | | nsec |
| $t_{DA}$ | 50 | | nsec |
| $t_{VCW}$ | 1.0 | | usec |
| $t_{SVE}$ | | 500 | nsec |
| $t_{DW}$ | 150 | | nsec |
| $t_{DLY}$ | 60 | | nsec |
| $t_{ECK}$ | 50 | | nsec |
| $t_{RD}$ | 300 | | nsec |
| $t_{RDO}$ | 16.0 | | usec |
| $t_{RDA}$ | | 100 | nsec |
| $t_{RDD}$ | | 300 | nsec |

FOCUS/ILLUMINATION INDICATOR

The camera provides a visual indicator of both illumination and contrast. The illumination feature allows the operator to easily adjust the lens aperture setting (f-stop) for his particular environment. This is accomplished by using the camera interface commands to position the array at the center of the image plane. Then, with the function select switch set to ILLUMN and by manipulating the lens aperture setting, the operator can select the aperture setting and not saturate the video electronics in the camera.

The illumination level used for this function is linearly proproportional to the light intensity (peak) falling on the photodiode array at the measurement position and will have been compensated for linear pixel response.

The focusing operation is accomplished in a similar manner with the select switch positioned at to FOCUS. By manually adjusting the lens focus, a peak in the plus direction will indicate highest contrast and, therefore, optimum focus.

The focus and illumination circuits are free-running, and, therefore, always updated during camera operation.

The saturation LED is lit during any scan in which a video saturation condition is detected. The data from the camera will not be interrupted or altered under this condition. A camera restore or new scan command at the electrical interface will reset this indication.

SINGLE-BIT THRESHOLD

The camera has a single-bit video circuit. The single-bit decision is performed by an analog comparator circuit operating on fully-compensated video signals.

The camera controller is capable of manipulating the video threshold for this feature, and, therefore, the single-bit decision point (black/white edge) is commandable via the standard camera interface and command structure. The six bits of threshold adjust gives a 9–984.4-foot lambert range in 15.6-foot lambert increments.

Master Microprocessor Program Flow

The Intel 8741 manufactured by Intel Corporation, Santa Clara, Calif., shown in FIG. 2, is the interface between the host processor which may, for example, be a TMS-9900 manufactured by Texas Instruments, Houston, Tex., and the slave microprocessor (28), an Intel 8748. The 8741 has the responsibility of setting the window size, initializing the window to the maximum size, and receiving commands from the host and any data (such as starting position, ending position of the frame) and sending that data to the 8748. The following registers and ports are in the 8741:

| 8741 REGISTERS | | | |
|---|---|---|---|
| R1 - Start (high byte) | | | |
| R2 - Start (low byte) | | | |
| R3 - Height | | | |
| R4 - Maximum Velocity | | | |
| R5 - End (high byte) | | | |
| R6 - End (low byte) | | | |
| 8741 PORTS | | | |
| Port 1: | Bit 0: | Upwind | |
| | Bit 1: | Downwind | |
| | Bit 2: | SEL WIND | |
| | Bit 3: | CLK SEL | |
| | Bit 4: | RD CLK | |
| | Bit 5: | Busy | 1 = Busy |
| | Bit 6: | Listen | |
| | Bit 7: | OBR (Data Ready) | 1 = Ready |
| Port 2: | Bit 0–7: | Bits 3 through 10 of Window Address | |

Refer now to FIGS. 4A–4L which comprise a flowchart of the microprogramming for the master 8741 microprocessor shown in FIGS. 1 and 2. First (FIG. 4A) the microcode in the 8741 initializes registers R1-R6, and initializes the window (302). The microcode then starts the command-processing routine (304). The microprocessor sets the busy bit 5 and the OBR bit 7 to zero (306). Next the data-bus buffer (DBB) is checked to see if it is full (308). If yes, the command is received and stored (310) and the busy bit is set to one (312). A table of commands is stored in the 8741. The table pointer (314) is initialized and a subloop is entered which tests for end of table (316). If yes, the program returns to the start of the command-processing routine (304). If no, it is not the end of the table, and a check is made to see if a match is found in the table (318). If no, the table pointer is updated (320) and the loop is entered again. When a match is found, the microcode goes to process the command found at the matched table entry (322). At this point the microcode also loads data from the host processor into the 8741 and, depending upon the particular command being executed, sends the appropriate commands and data to the 8748 slave processor.

Figure 4A:
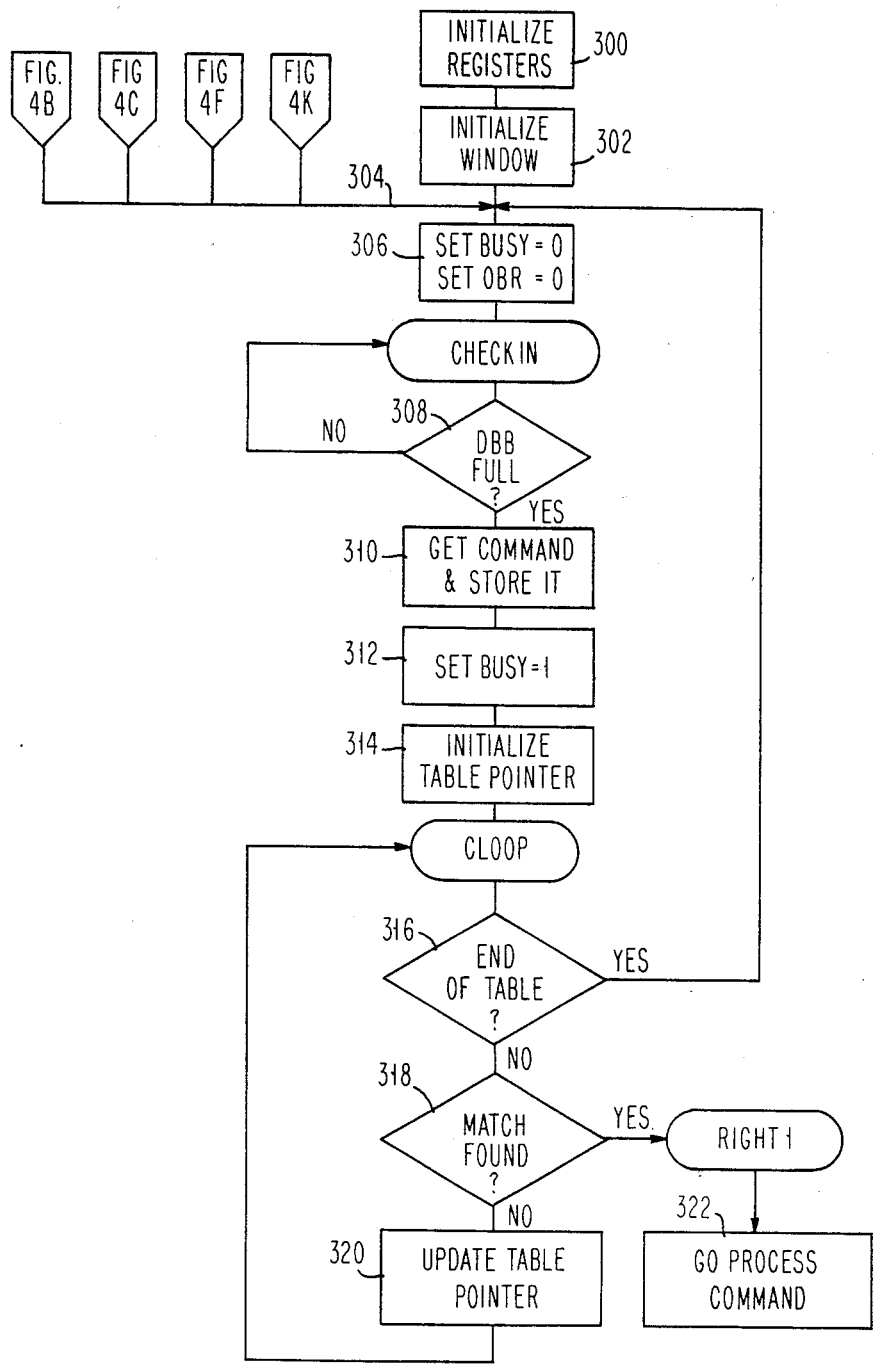
Figure 4B:
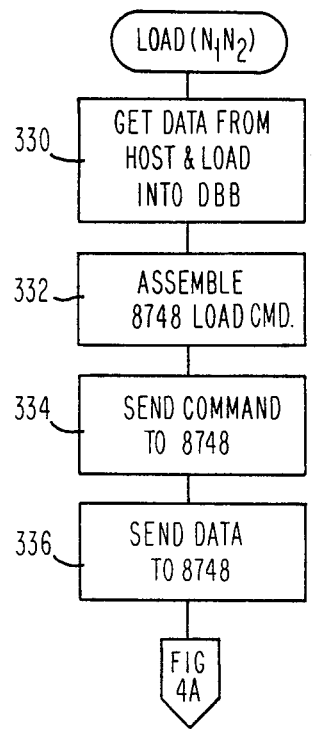
Figure 4E:
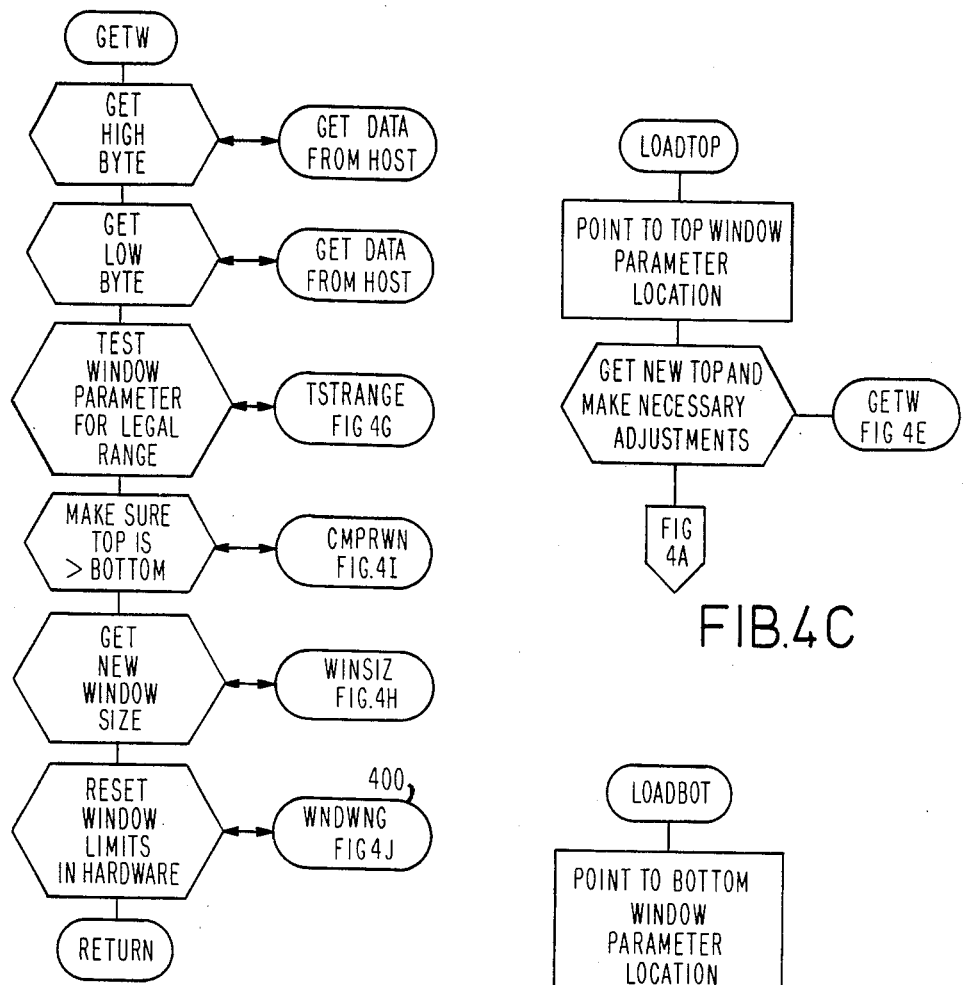
Figure 4D:
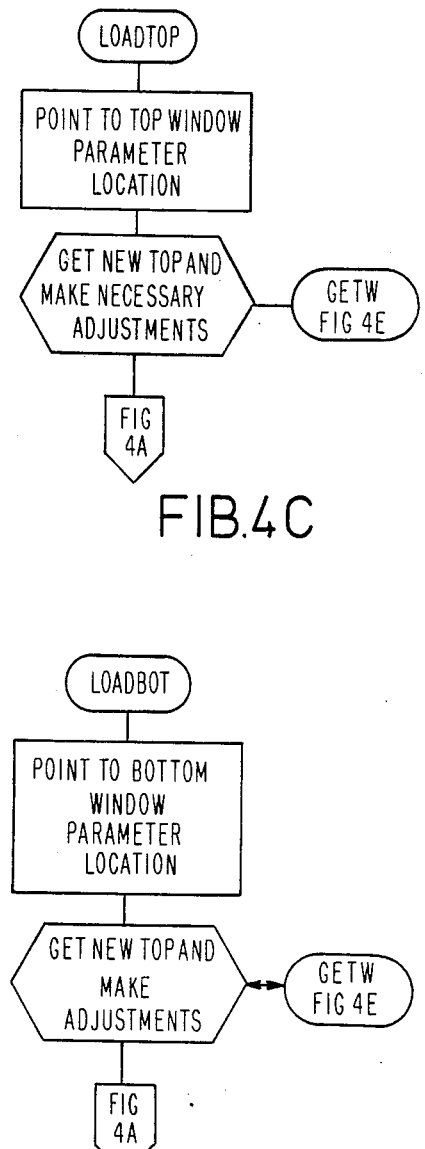

Referring now to FIG. 4B, the load command for loading data from the host to the data-bus buffer (DBB) wil now be described. Data are transferred between the 8741 and the 8748 by loading the DBB register and setting the Listen Line (port bit 6) to one, and then resetting the Listen Line to zero when the DBB is emptied. Listen is connected to the T-0 pin of both the 8741 and the 8748. By testing the state of pin T0 on the 8748, the 8748 microprocessor knows whether the 8741 has a command or data for transfer to it. First the 8741 gets data from the host and loads it into the DBB (330). Next the 8741 assembles the 8748 load command (332), then sends the command to 8748 (334) followed by the data (336). The flow then returns to the command processing routine (304-FIG. 4A) to process the next command.

Referring now to FIGS. 4C–I, the parameter modification commands for changing the window size and speed of the array will now be described. In FIG. 4C, the Set Upper Window Boundry and in FIG. 4D, the Set Lower Window Boundry commands are executed to get the appropriate parameters. Each of these command program flows call the Get W subroutine of FIG. 4E. The Get W subroutine calls the subroutines TSTRANGE, FIG. 4G, CMPRWN, FIG. 4I, WINSIZ, FIG. 4H, and WNDWNG, FIG. 4J before returning to the start point (304) of FIG. 4A.

Figure 4F:
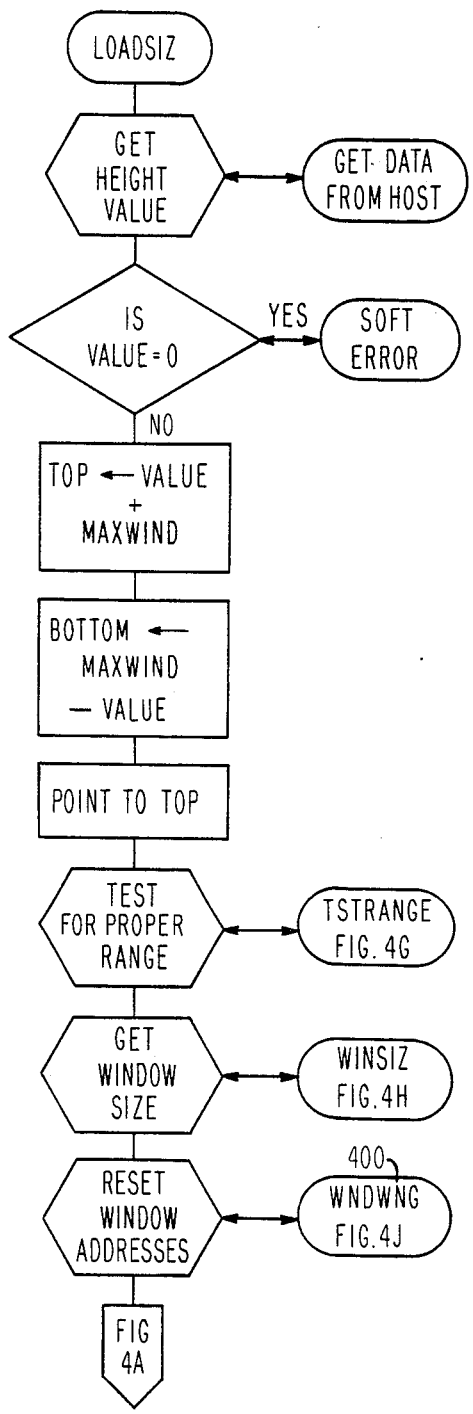
Figure 4G:
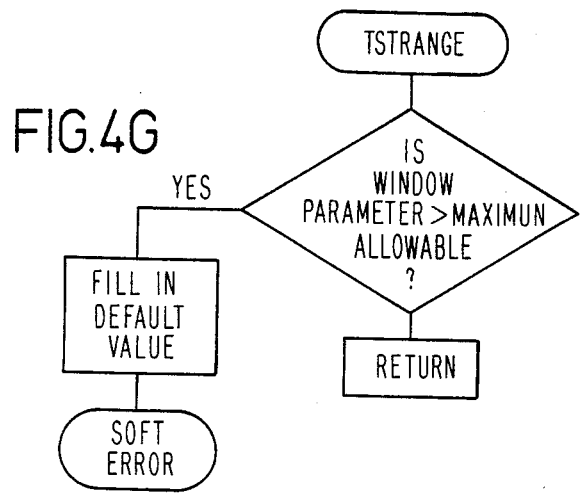
Figure 4H:
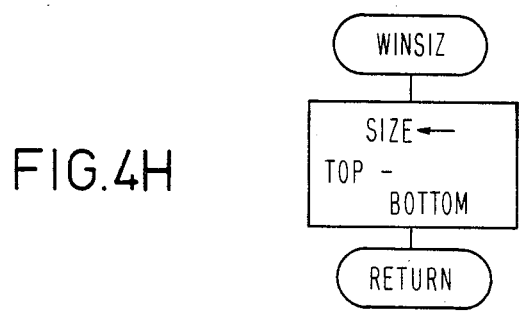
Figure 4I:
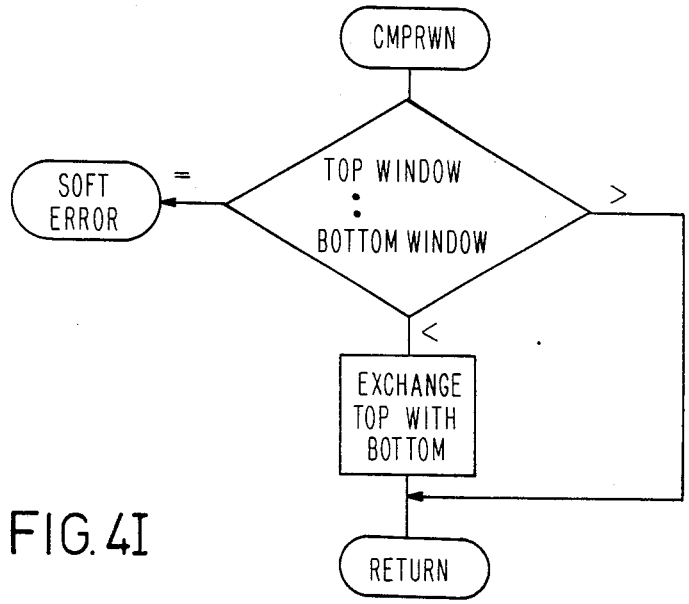

In FIG. 4F, the Set Window Size command is executed to get the appropriate parameters to change the window height. The command program flow calls the subroutines TSTRANGE, FIG. 4G, WINSIZ, FIG. 4H, and WNDWNG, FIG. 4I before returning to the start point (304) of FIG. 4A.

Figure 4J:
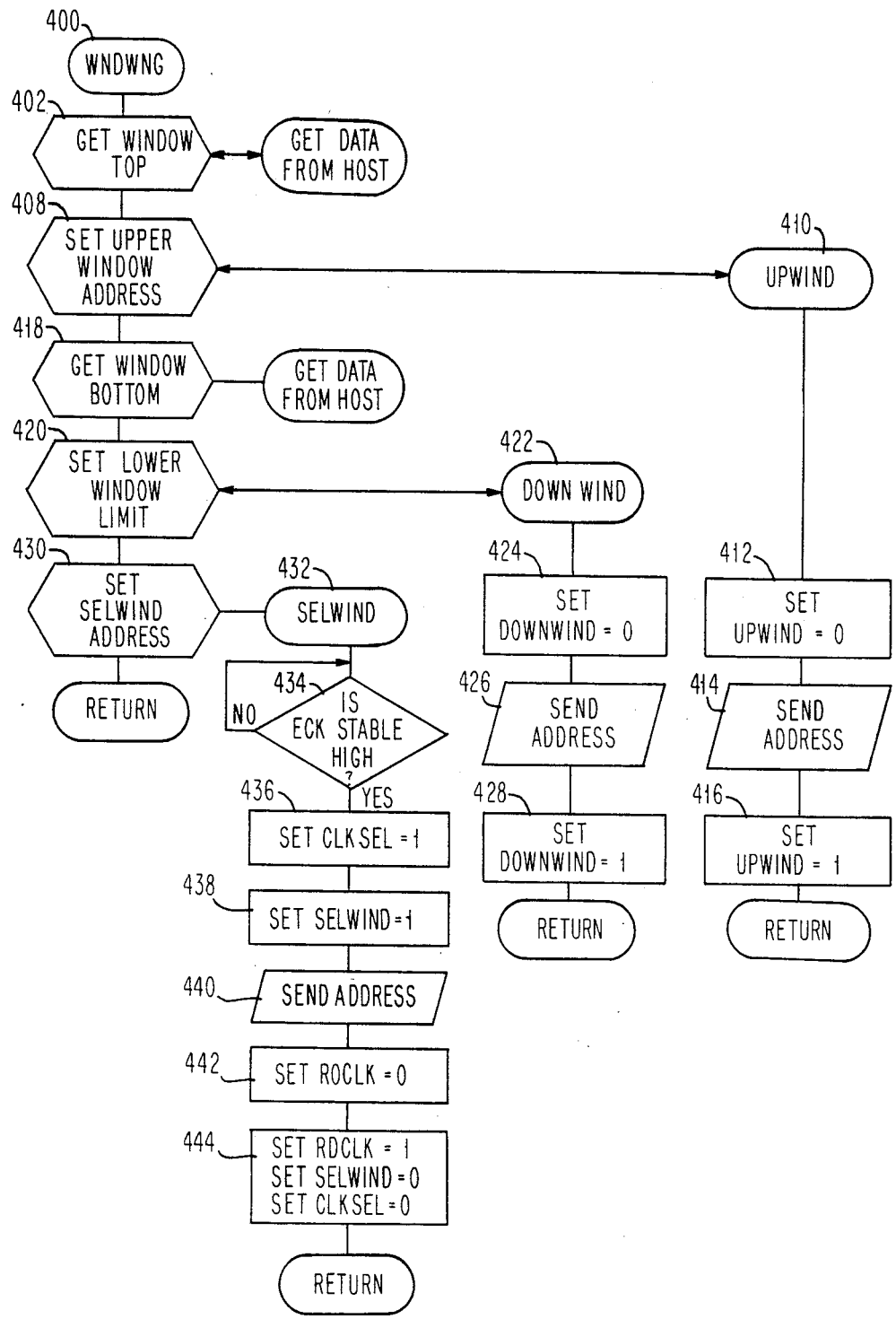

The WNDWNG subroutine (400) is shown in FIG. 4J. First a new window top value is received from the host processor (402). Once the top window address has been received, the up-window subroutine (410) is entered. The upwind subroutine first sets the upwind bit on the 8741 port to zero (412), sends the address (414), and then sets the up-window bit to one (416) and returns to the main program stream.

The next step in the program is to get a new window bottom value from the host processor (418). Once the bottom window address has been received, the down-window subroutine (422) is entered. The downwind subroutine sets the downwind bit on the 8741 port to zero (424), sends the address (426), and then sets the downwind port to one (428). The subroutine returns to the main flow where the next step is to be set the Select Window address (430) and enter the selwind subroutine (432).

The selwind subroutine makes sure that the address clock is being accessed by the processor rather than by the hardware by setting of the Clock Select Bit to one (436). The select window bit is set to one (438), the address is sent (440), and after being sent, the Read Clock is set to zero (442). Then the Read Clock is set to one, the Select Window is set to zero, and the Clock Select is set back to zero (440).

The selwind subroutine returns to the main flow, which returns to the program flow of FIG. 4A to decode the next command.

Figure 4K:
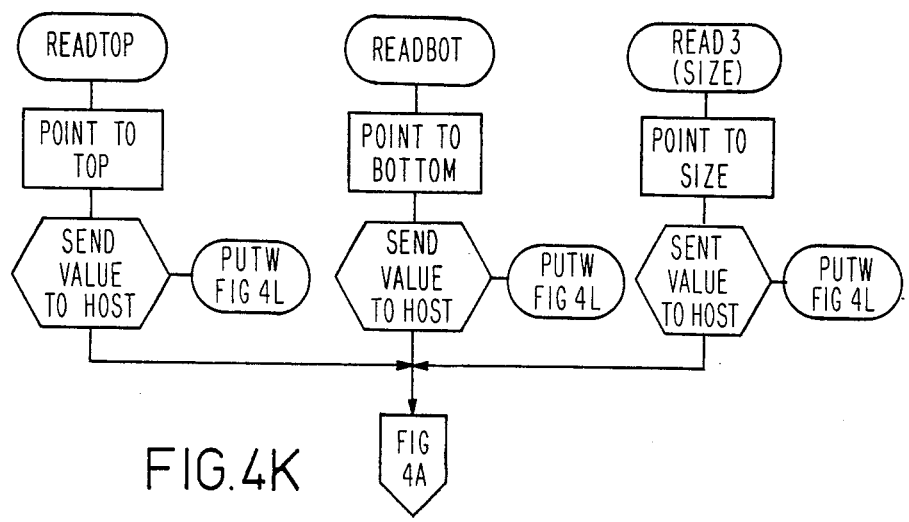
Figure 4L:
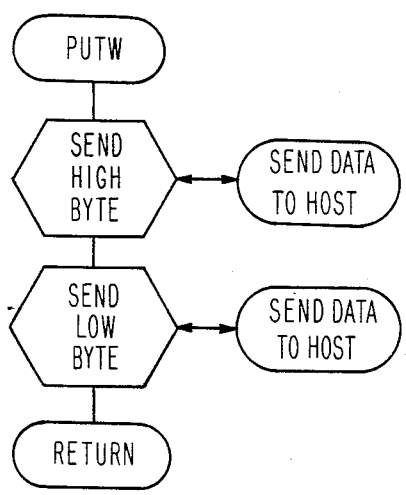

The parameter read operation commands are shown in FIGS. 4K–4L. The Read Start Position is done by the READTOP subroutine. The Read End Position is done by the READBOT subroutine. The Read Window Size is done by the READ 3 subroutine. All three subroutines call the PUTW subroutine of FIG. 4L.

Slave Microprocessor Program Flow

The following registers and ports are found in the 8748:

| 8748 REGISTER | | | |
|---|---|---|---|
| R1 - Present Location (high byte) | | | |
| R2 - Present Location (low byte) | | | |
| R3 - Distance | | | |
| R4 - Distance (low byte) | | | |
| R5 - Position N (high byte) | | | |
| 8748 ALTERNATE REGISTERS | | | |
| | RAM Location | | |
| 1 - Start High Byte | 25 | | |
| 2 - Start Low Byte | 26 | | |
| 4 - Maximum Velocity | 28 | | |
| 5 - End High Byte | 29 | | |
| 6 - End Low Byte | 30 | | |
| 8748 PORTS | | | |
| Port 1: Bit 0: Velocity 0 | | | |
| Bit 1: Velocity 1 | | | |
| Bit 2: Velocity 2 | | | |
| Bit 3: Velocity 3 | | | |
| Bit 4: Velocity 4 | | | |
| Bit 5: Disable | 0 = Disable; | 1 = Enable | |
| Bit 6: Direction | 0 = Forward; | 1 = Reverse | |
| Bit 7: Detent | 0 = Detent ; | 1 = Velocity | |
| Port 2: Bit 0: Talk | | | |
| Bit 1: Free | | | |
| Bit 2: LED | 0 = Off | | |
| Bit 3: Video Sync (LAGE) | | | |
| Bit 4: Home Limit Sensor | 0 = Not Home; | 1 = Home | |
| Bit 5: FEN | | | |
| Bit 6: SEN | | | |
| Bit 7: 1728/2048 | | | |

Figure 5A:
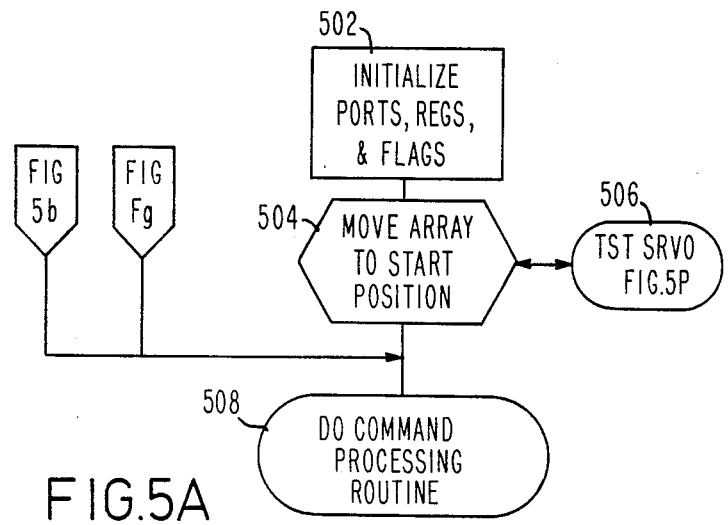
FIGS. 5A–5P are flowcharts of microprogramming for the slave microprocessor shown in FIGS. 1 and 2A.
Figure 5D:
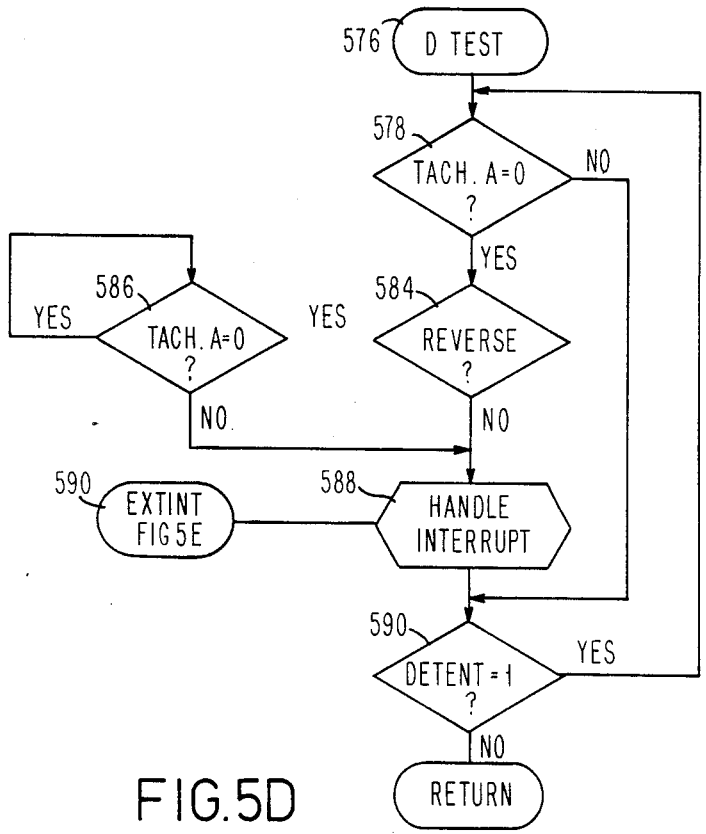
Figure 5B:
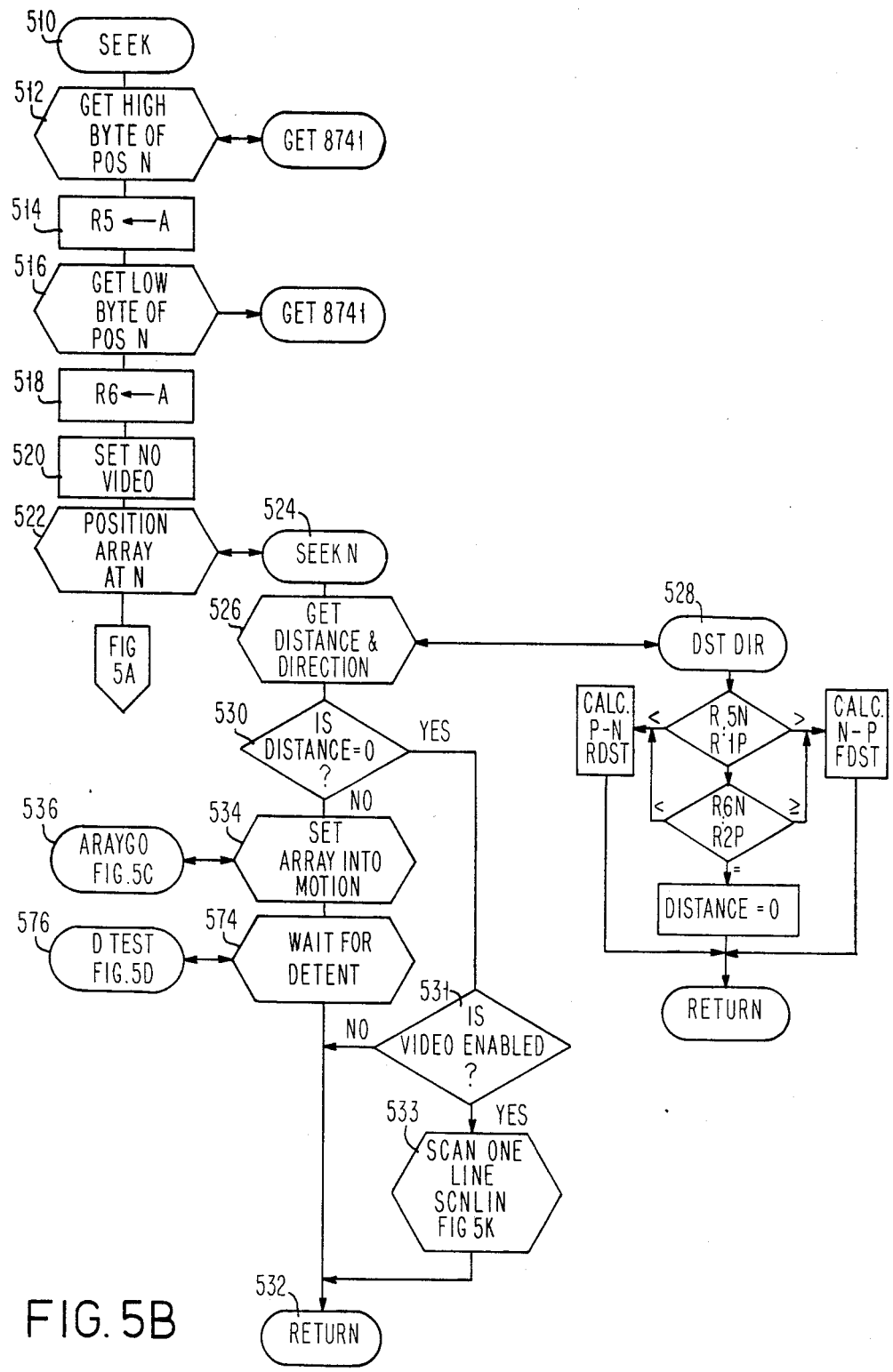
Figure 5C:
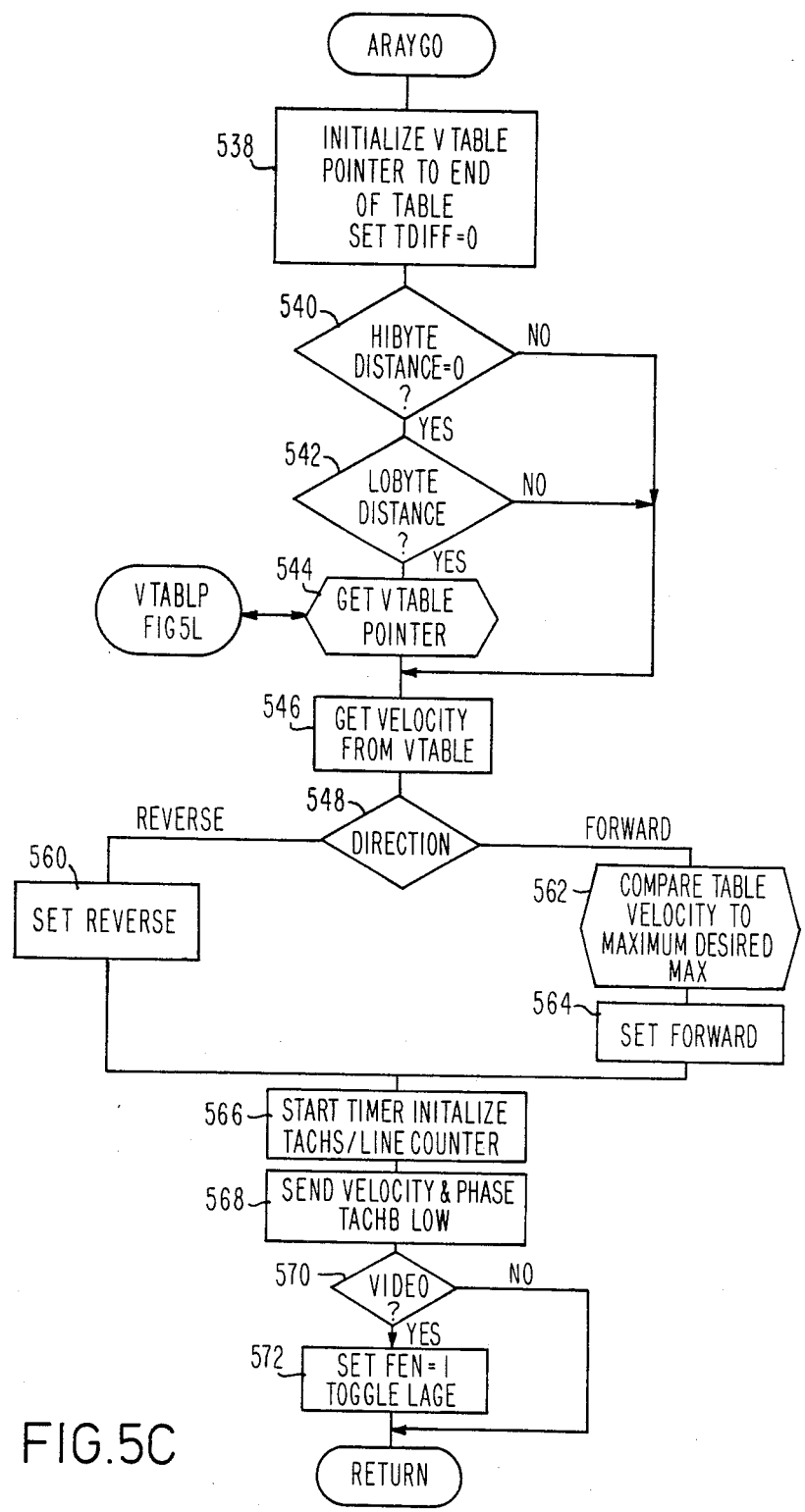
Figure 5E:
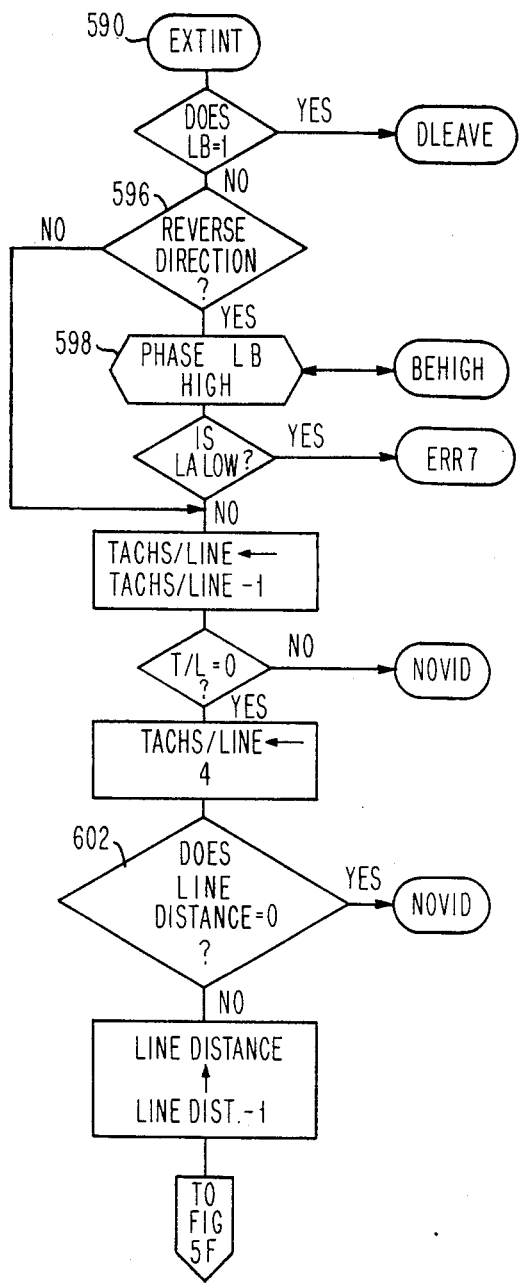
Figure 5F:
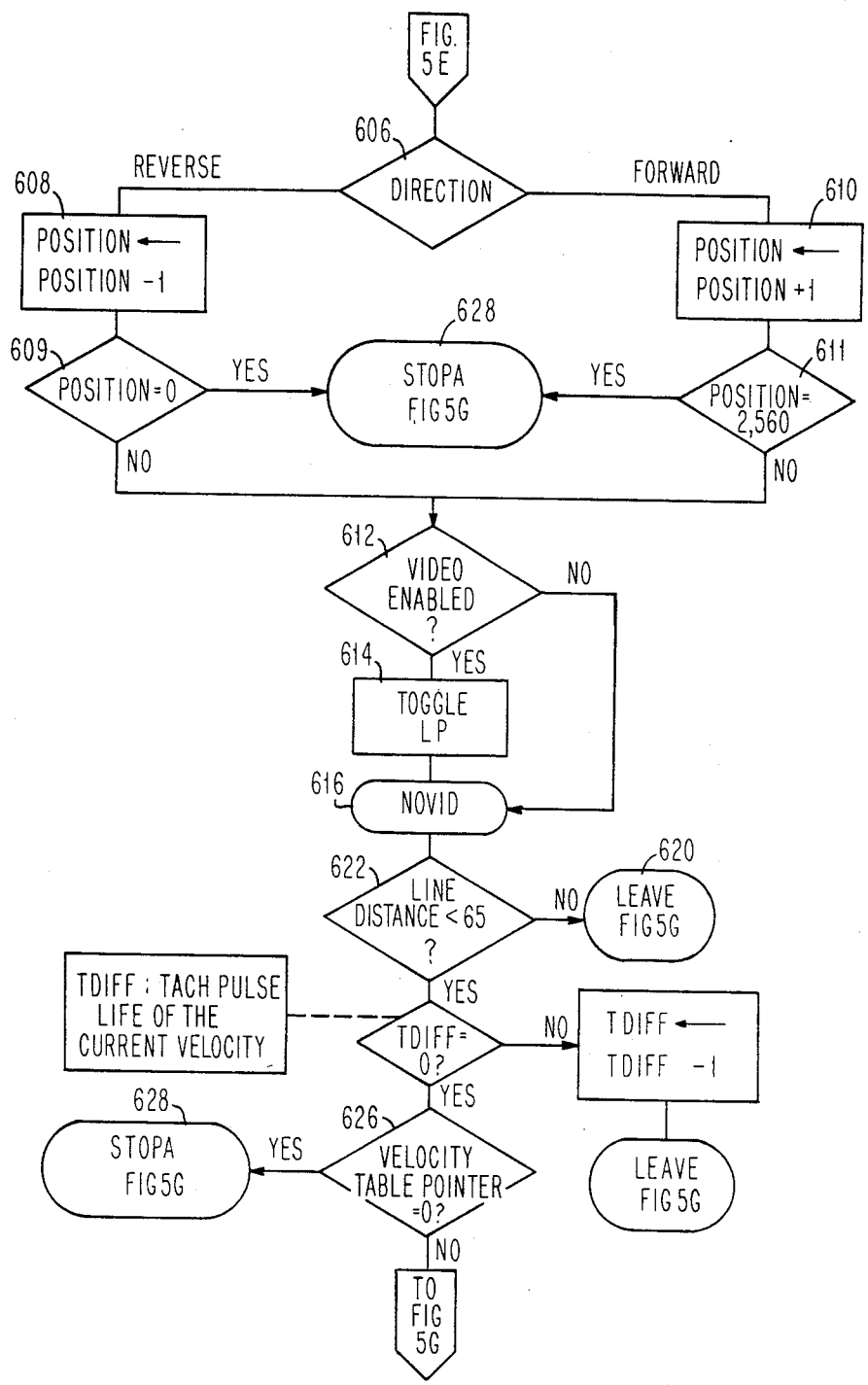
Figure 5G:
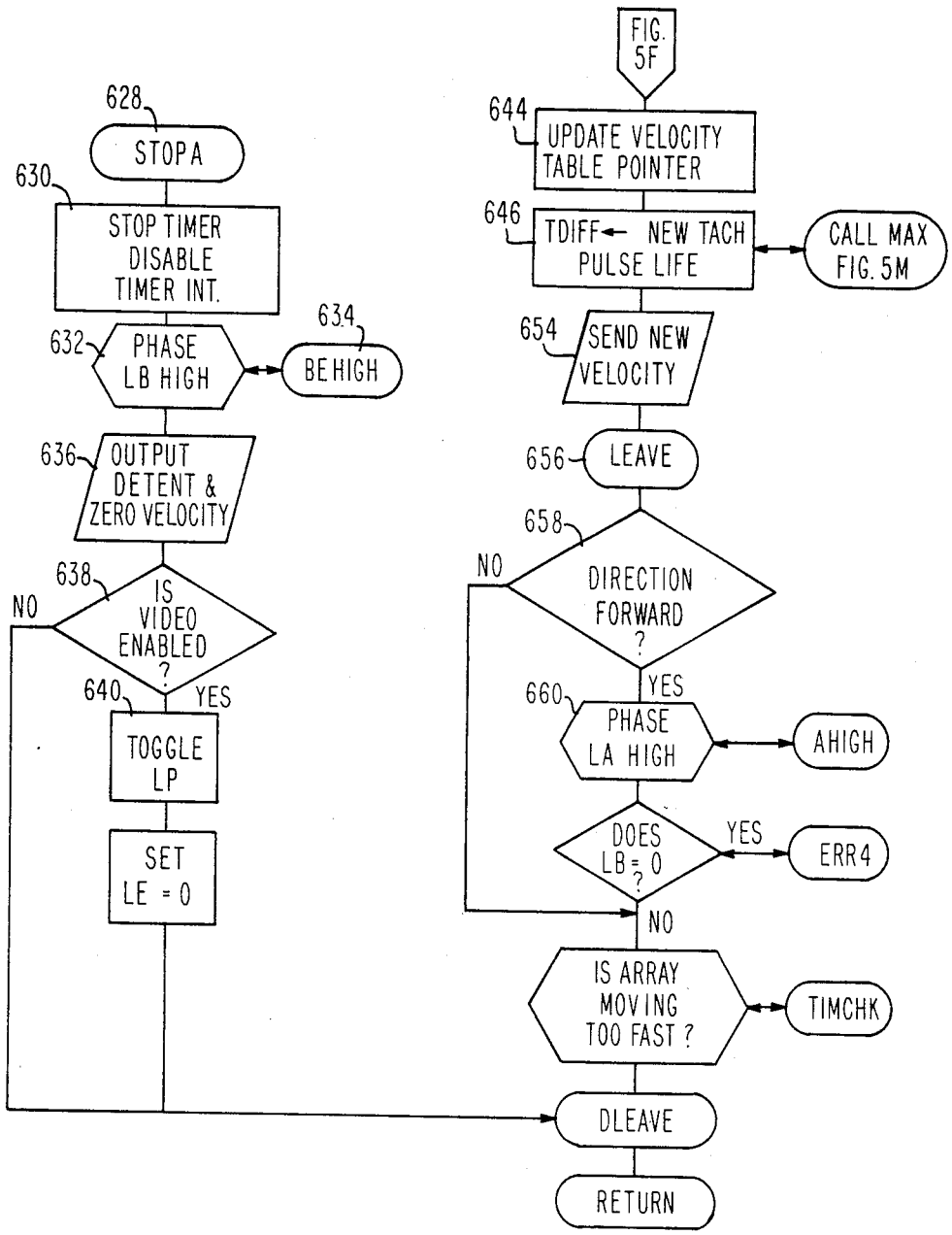
Figure 5H:
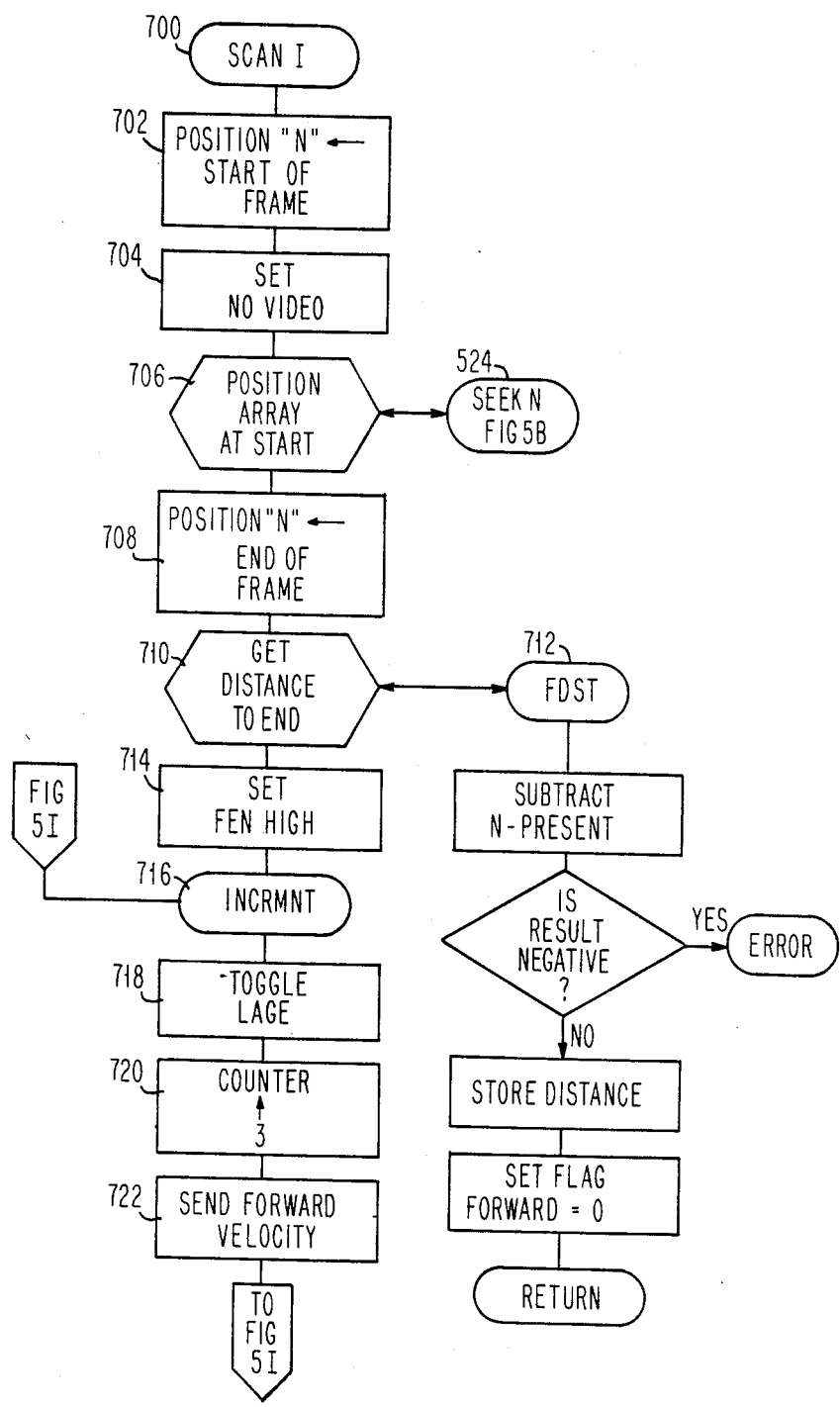
Figure 5I:
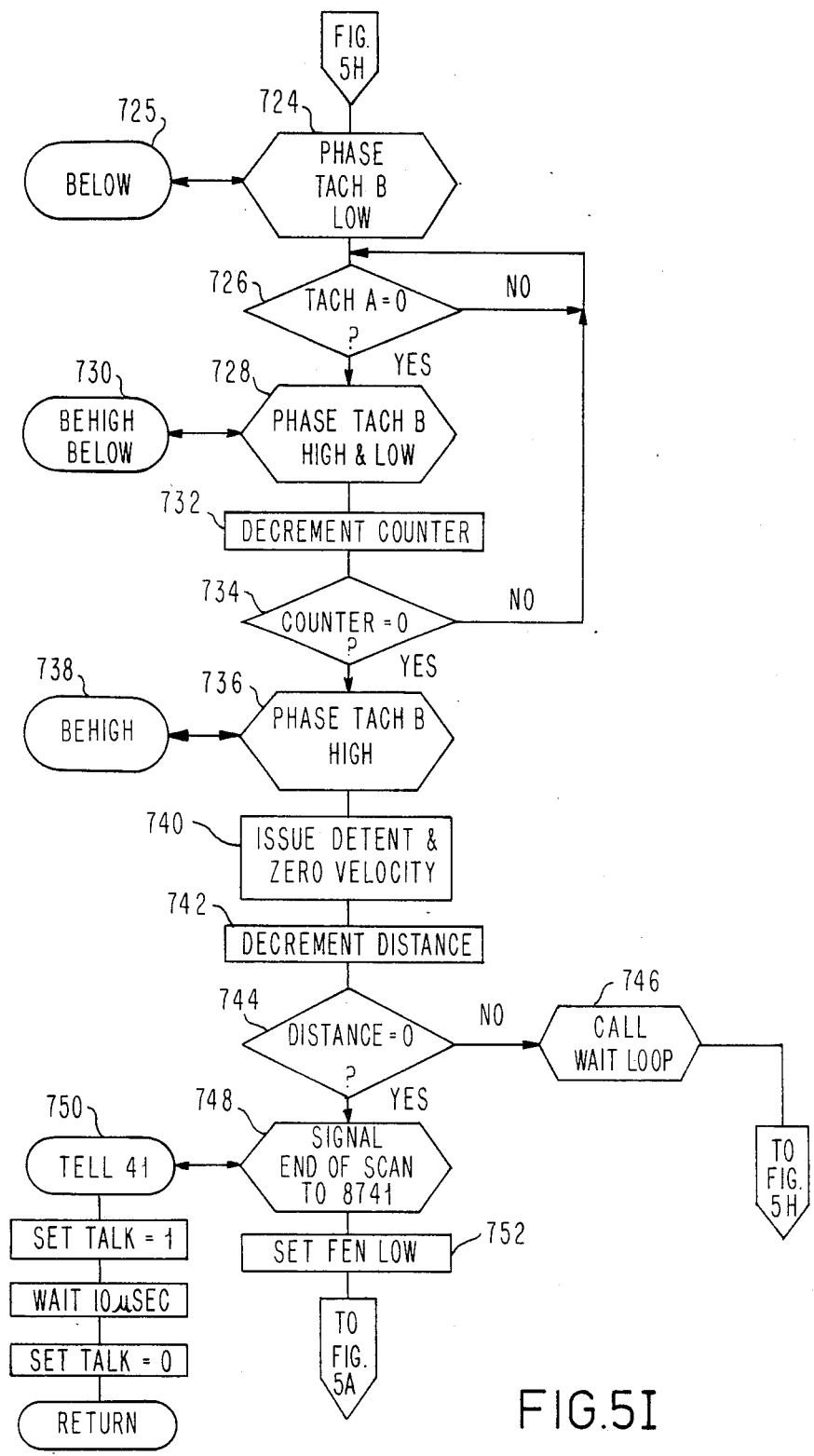
Figure 5J:
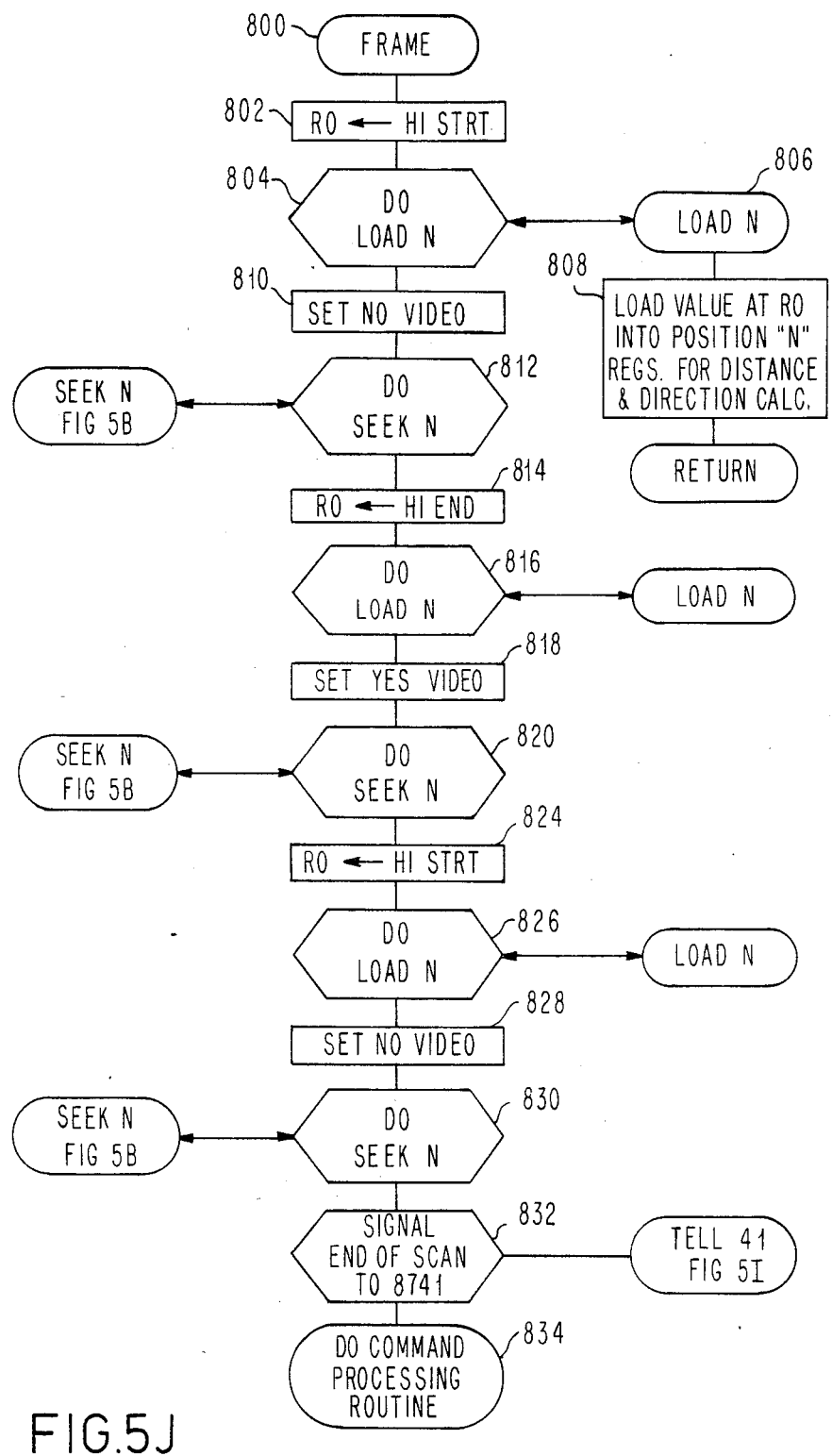
Figure 5K:
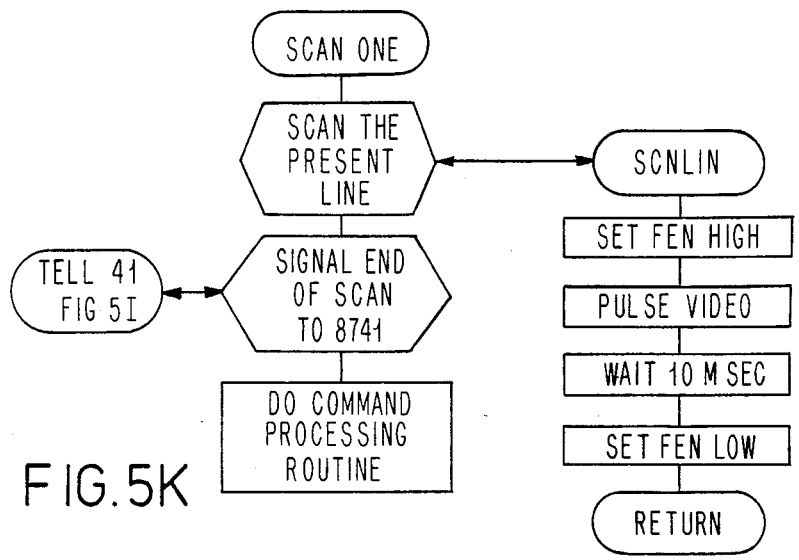
Figure 5L:
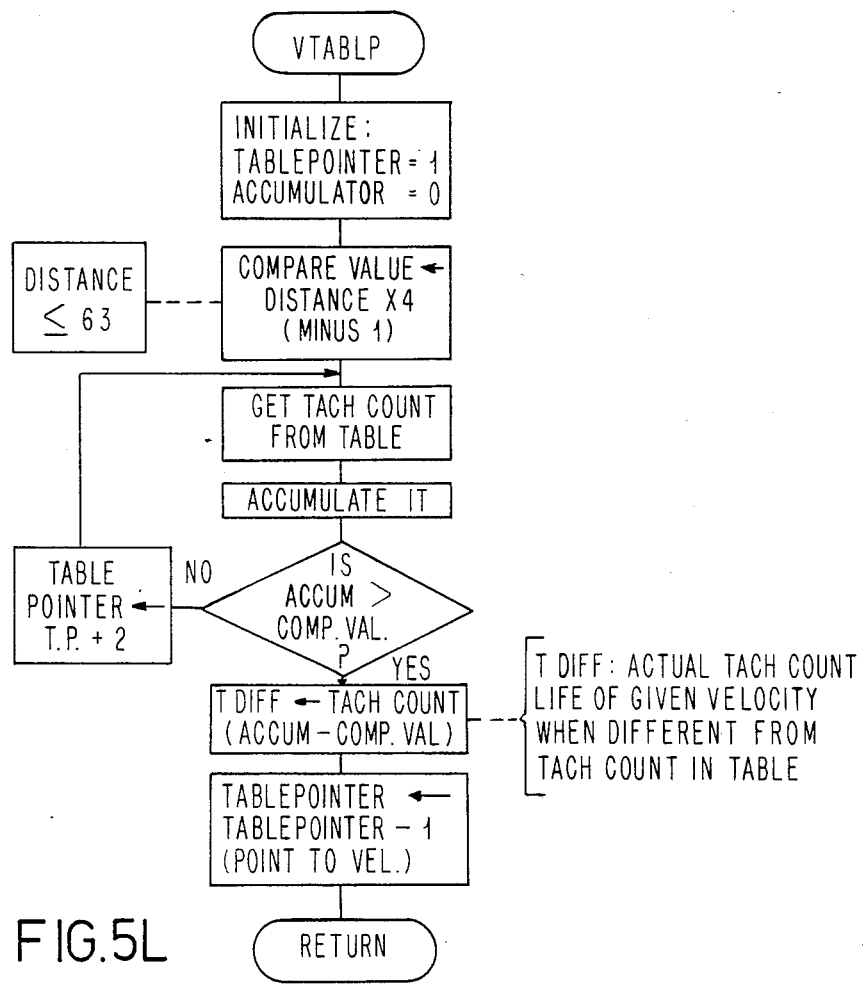
Figure 5M:
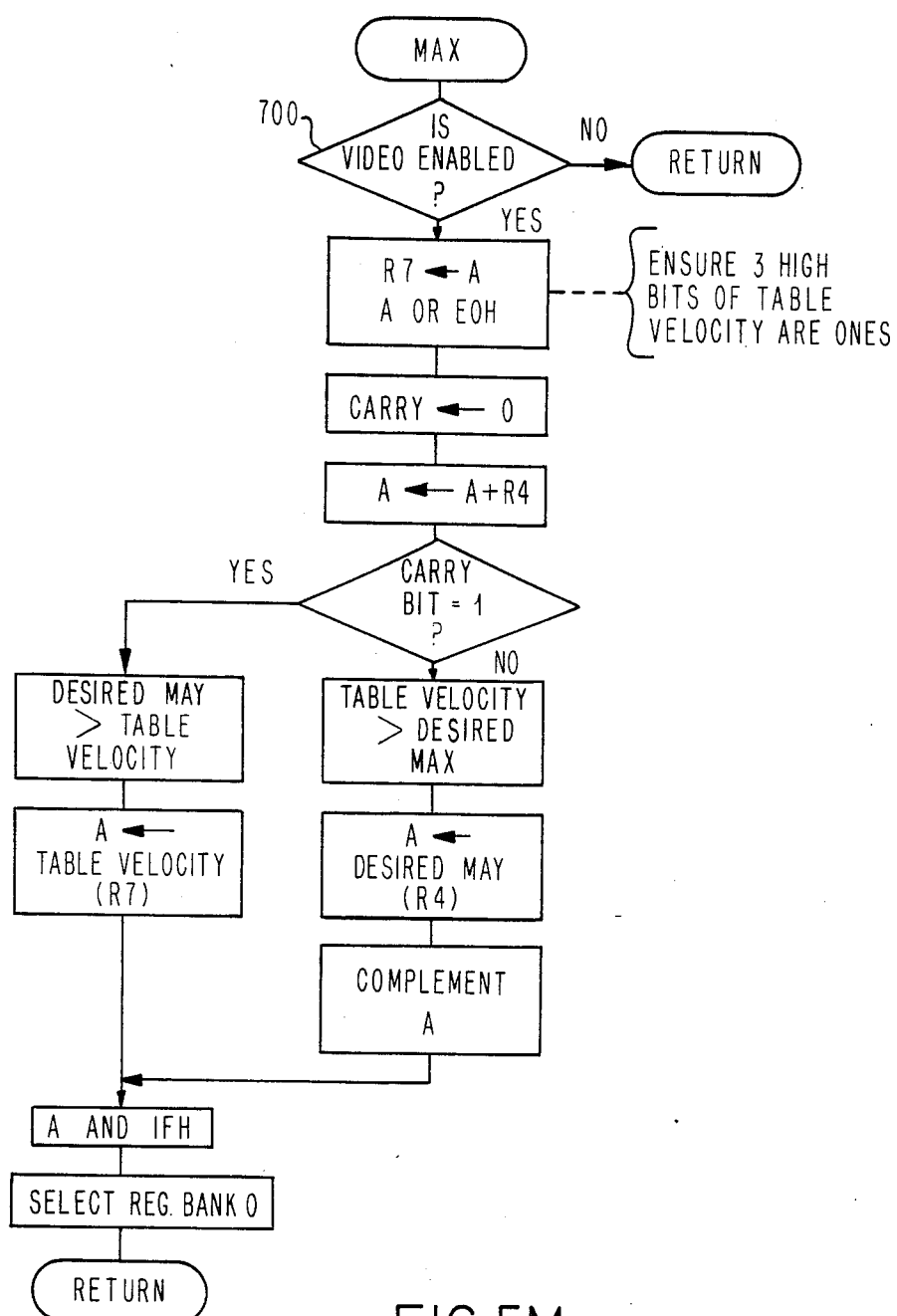
Figure 5N:
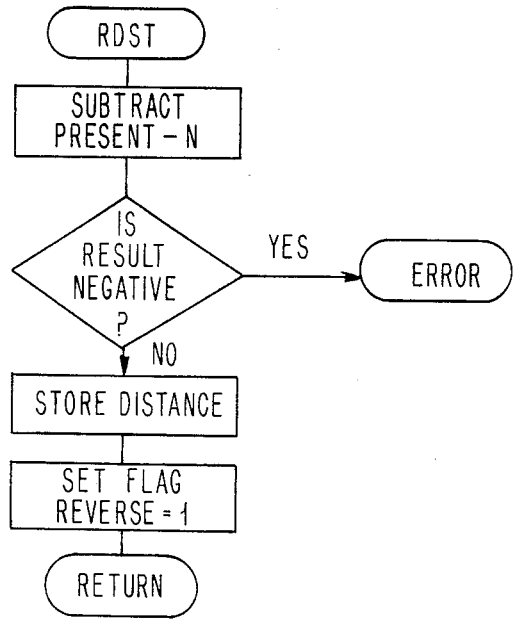
Figure 5O:
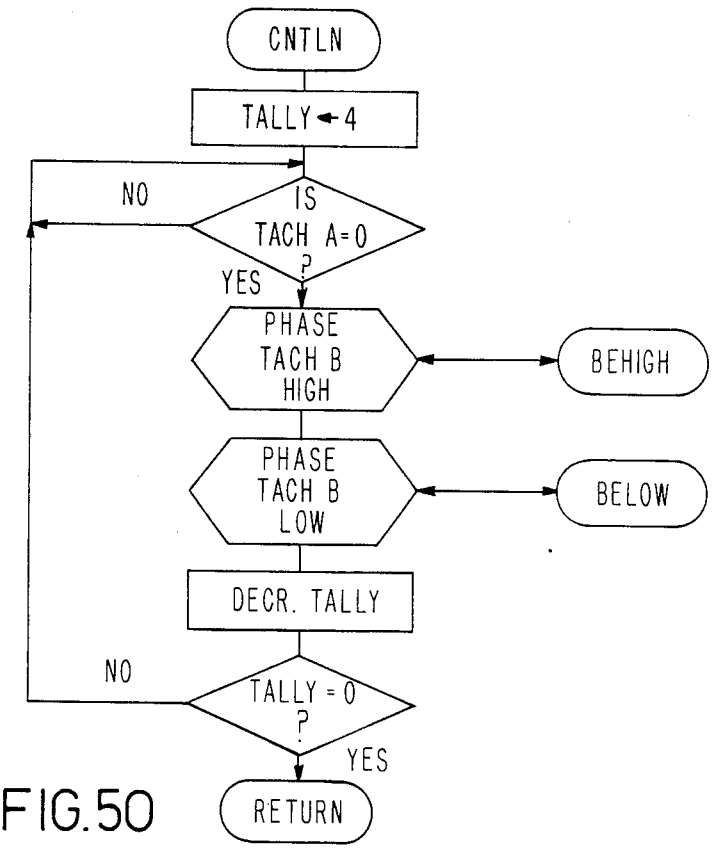
Figure 5P:
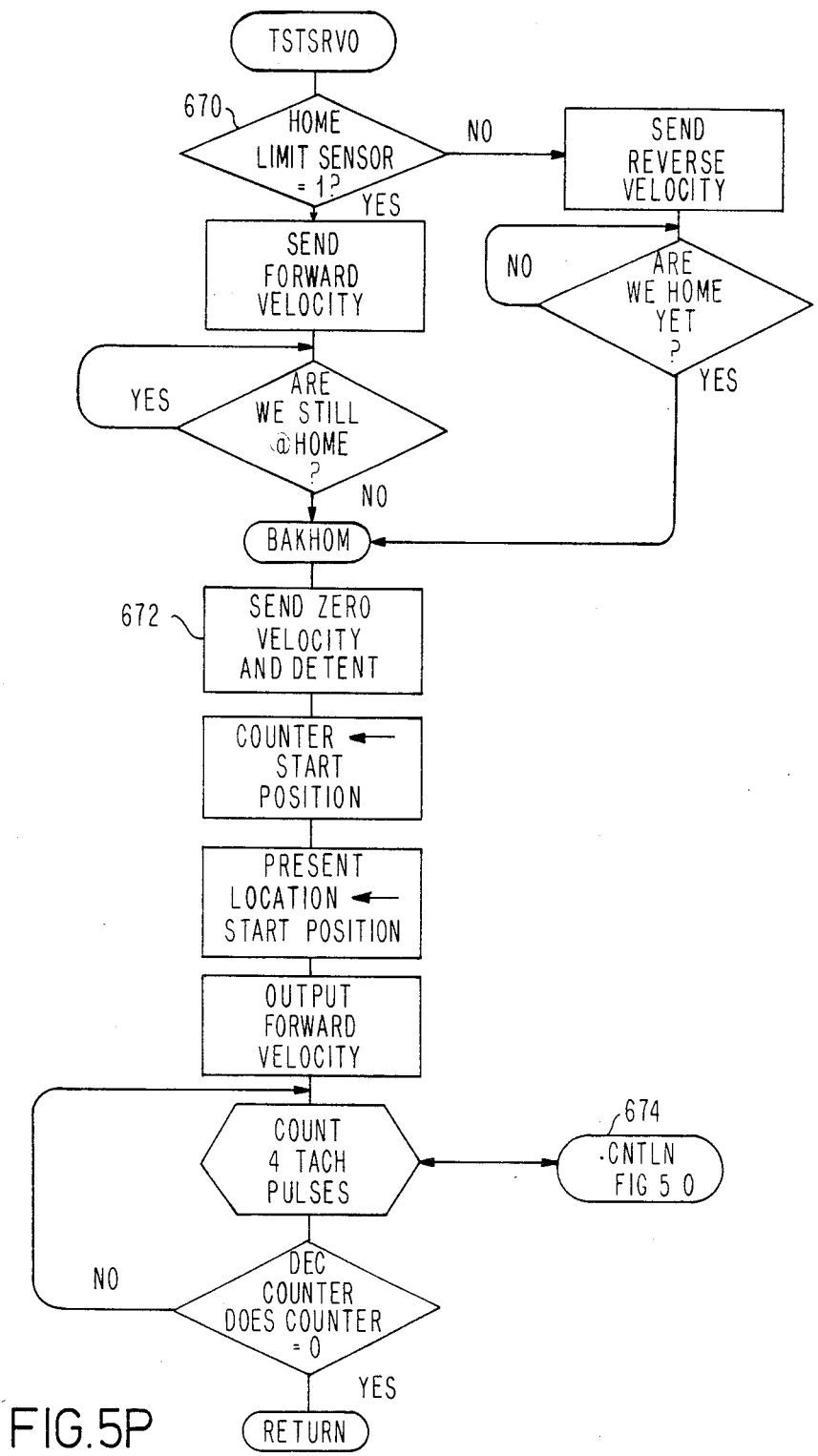

Refer to FIGS. 5A–5P which are flowcharts of microprogramming for the Intel 8748 slave microprocessor (28) shown in FIGS. 1 and 2. The programming for the 8748 proceeds from an initializing procedure (500-FIG. 5A) which initializes ports, registers, and flags (502) and moves the array to the start position (504). To move the array to the start position, a TSTSRVO subroutine (506), shown in FIG. 5P, is entered.

The TSTSRVO subroutine of FIG. 5P, initially moves the array (670) until it reaches the home limit sensor position (the home limit sensor-17, FIG. 1), then moves the array to an offset position, and detents the array (672) at this electronic home position, the start of frame position. To do this, the TSTSRVO subroutine calls the CNTLN subroutine (674) of FIG. 5O which counts 4 tach pulses to increment the array a predetermined offset from the home limit sensor position. Subsequent operations will return the array to this offset position rather than to the home limit sensor position. The electronic offset position is more accurate than the mechanical home limit position.

After this is accomplished, the TSTSRVO subroutine returns to the flow of FIG. 5A and the program enters a command processing routine (508) to do a decoded command. The command processing routine (508) is identical to the command processing routine of the 8741 described previously with reference to FIG. 4A.

Referring now to FIG. 5B, a decoded Seek Position N command is executed as follows. This command is given by the host which desires to have the array moved to a given position, N. In this case, the 8741 transmits the address of position N to the 8748, which comprises two bytes of data. The high byte is transferred first (512), followed by the low byte (516). The microcode sets the No Video flag (520) and then calls the SEEK N subroutine to position the array at position N (522).

First, the SEEK N subroutine gets the distance and direction (526) by entering the DSTDIR subroutine (528). This DSTDIR subroutine compares the present position (P) to the desired position (N) and depending upon whether the result is less than, greater than, or equal, determines if the direction should be reverse, forward, or none. A check is then made to see if the distance is zero (530). If yes, a test is made to see if video is enabled (531). If video is enabled, a single slice of data is scanned (533), before the SEEK N subroutine returns to the main program (532). If the distance is not equal to zero, the array is set into motion (534) by entering the ARAYGO subroutine (536).

Referring now to FIG. 5C, the ARAYGO subroutine has the responsibility of initializing the Velocity Table pointer and getting the proper velocity value (538). If the array is at a distance of less than 64 lines (542), then the array is near the end of the move, and the microcode has to access the Velocity Profile Table (544) which is a table of different velocities at different distances to provide for an even deceleration.

If the distance is greater than 64 lines, then a constant high velocity is used to move the array (546) until it reaches the deceleration area. Next, the direction is tested (548), and if it is to be reverse, the microcode sets reverse (560), and if it is to be forward, the bit is set to forward (564). Next, the program starts the timer, and initializes the tachometer/line counter (566).

Port 1 on the 8748 has five velocity bits (0–4), a disable bit, a direction bit, and a detent bit. The appropriate bits are set and outputted to the motor and controls logic shown in FIG. 2A to start the array in motion. There are four tack interrupts per line. The tachs/line counter is initialized (566). The velocity from the velocity table is sent (568), and the microcode waits until the Tack B line goes low. Next, the video bit is sampled (570) and if enabled, the microcode toggles the longitudinal Access Gate Enable (572), which is a signal to the hardware that the data from the array can be clocked out by means of the video sync circuit shown in FIG. 2. The subroutine then returns to the Seek N subroutine (524) of FIG. 5B.

The next step in the SEEK N subroutine is wait for detent (574) which enters a DTEST subroutine (576) which tests for movement of the array to stop.

Referring now to FIG. 5D, the DTEST subroutine (576) is based on the state of Tack A (blocks 578 and 586) and the direction (block 584). If tach. A is not zero, the flow tests the detent bit 7 on port 1 of the 8748. If detent is not one, the flow returns to the SEEKN routine to wait for detent (574, FIG. 5B). If detent is one, the flow returns to the DTEST routine. The DTEST subroutine calls the External Interrupt EXTINT subroutine (590).

Referring now to FIG. 5E, the EXTINT subroutine first reinitializes the timer/counter so that the program does not timeout prematurely, saves the accumulator contents (594), and depending upon the direction (596), waits for Tack B to reach a certain point so that the same interrupt is not utilized over and over. Then, if the array has moved four pulses, as indicated by the line distance being zero (602), the line distance is decremented (604). Depending upon direction (606), the array position is either decremented (608) or incremented (610). Also a test is made to see if the array is at either limit, zero at one end, or 2560 at the other end.

If video is enabled (612) on every line, the longitudinal Access Gate Enable line is toggled (614) to gate the video data out of the array. Next, a test is made to see if the array is in the Velocity Profile Table area (618) which is the last 64 lines of distance to be traveled by the array. If yes, a test is made to see if there are more tack pulses at the present velocity (622). If no, a test is made to see if the Velocity Table Pointer is equal to zero (626). If yes, the Tach A pulses are stopped by entering the STOP A subroutine (628), described below.

If the Velocity Table Pointer is not equal to zero (626), the microcode updates the Table Pointer (644) and gets a new velocity and its tack pulse life (646). The MAX subroutine, FIG. 5M, is called, which compares the new velocity with the maximum desired velocity. Referring to FIG. 5M, if video is not enabled (700), return is immediate. On entering the MAX subroutine, A contains the table velocity (complemented), and R4 of register bank 1 contains the desired maximum velocity (uncomplemented).

Referring again to FIG. 5G, after completing the MAX subroutine, a new velocity value is sent (654). If going forward (658), then it is necessary to phase Tack A high (660) in order to eliminate the possibility of using the same interrupt more than once. The EXTINT subroutine now returns to the DTEST SUBROUTINE, FIG. 5D.

If any of the stop conditions occur, that is, if the array travels to the end of its limit (609, 611, FIG. 5F), or if it is the end of the Velocity Profile Table (626, FIG. 5F), then the STOP A routine (628) is entered.

Referring to FIG. 5G, first, the timer/counter is stopped (630) and then the array is stopped by sending bit 0-zero velocity and bit 7-detent (636). If the video bit had been set (638), one last longitudinal Access Gate Enable pulse is generated, and bit 3-FEN is set to zero (640). Frame Enable (FEN) would have been set high if bit 5-video had been set (570), to cause the hardware to output data.

Referring now to FIGS. 5H and 5I, an Incremental Scan command is executed as follows. First, Position N is made equal to the start of the frame (702) and bit 5-video is set to no-video (704). Next, the array is positioned at the start of the frame (706) by calling the Seek N subroutine (524) discussed previously with reference to FIG. 5B. Using the End-of-Frame, the distance to the end is calculated (710) by calling the FDST subroutine (712). Next bit 3-FEN is set high (714). The counter for the number of Tack Pulse Interrupts is next set to three (720) and the forward velocity is sent (722). The flow continues at FIG. 5I. Every fourth interrupt is a line, so three interrupts are counted. Every time Tack A goes to zero (726), Tack B is phased high and low (728) so that the microcode does not reuse the same Tack A Interrupt. The counter is then decremented by one (732). If the counter equals zero (734), the microcode phases Tack B high (736), and the array is stopped by issuing detent and zero velocity (740). Next, the distance is decremented (742). If the distance is not equal to zero (744), a wait loop is entered (746) and then the increment routine (716) is entered again. This program loop continues until the distance is equal to zero at which time the end of scan is signaled to the 8741 (748) and bit 3-FEN (Frame-Enable bit) is set low (752). The flow returns to FIG. 1A, to do the command processing routine (508) to get the next command.

The execution of a frame command is shown in FIG. 5J. First, position N is defined as the start position (802), the video enable bit is set to no-video (810), and a SEEK N is commanded (812). Second, position N is defined as the end position (814), the video enable bit is set to yes-video (818), and a SEEK N is again commanded (820). Finally, position N is defined once again as the start position (824), the video enable bit is set to no-video (828), and a SEEK N is commanded (830). This has the effect of rewinding the array carrier back to the start of frame position.

The 8741 is then alerted to the fact that the frame scan is finished (832) so that it may then drop the BUSY signal, and await further communication from the host (834).

A single line is scanned by issuing a frame scan command (FIG. 5J) wherein the starting line is equal to the ending line.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. For use with a scanner which includes a focusing lens for focusing, at the image focal plane of said lens, the image of an object to be scanned;
    an array of the type in which light-sensitive devices are scanned in accordance with a self-scanning cycle to provide information within said scanned image in the form of a train of output pulses proportional in magnitude to the light intensity falling upon each successively scanned light-sensitive device; and
    means for moving said array in the image plane of said lens to thereby scan said image;
    a random access controller comprising:
        first means for receiving a command, said command including mechanical positional parameters and electronic scan parameter;
        said first means including means for decoding said command to produce first and second decoded command signals, said positional parameters in said command being qualified by said first decoded command signals and said electronic scan parameters in said command being qualified by said second decoded command signals;
        second means connected to said first means and to said means for moving said array, responsive to said first decoded command signals for mechanically positioning said array in accordance with said positional parameters in said command as qualified by said first decoded command signals; and,
        third means connected to said first means and to said self-scanning linear array, responsive to said second decoded command signals for selectively gating particular ones of said pulses in said train of output pulses from said array in accordance with said electronic scan parameters in said command as qualified by said second decoded command signals.

2. The combination in accordance with claim 1 wherein:
    said electronic scan parameters in said command provide information as to a user selected frame size scan output of said array; and, said third means comprises an address counter for generating addresses in response to successive output pulses in said train of output pulses from said array, and a window detector for outputting said train of output pulses upon the condition that a currently addressed output pulse occurs within said user-selected frame size specified in said command.

3. The combination in accordance with claim 1 or claim 2 wherein:

said positional parameters in said command provide information as to a user selected mechanical position of said array; and, said second means comprises a position indicator for generating position representations in response to the physical position of said array, and a servo loop for detenting said array upon the condition that a currently available position representation corresponds to said user selected mechanical position of said array specified in said command.

4. The combination in accordance with claim 1 or claim 2 wherein said positional parameters in said command specify the movement of said array to a first image line, said combination further comprising:

a first interface line (OBR);

a second interface line (ECK); and, a buffer memory connected to said array for receiving said particular ones of said pulses in said train of output pulses from said array, said pulses comprising first data corresponding to said first image line;

means for activating said first interface line (OBR) to notify said user that said first data in said buffer is available said third means including clock select means responsive to energization of said second interface line (ECK) for causing second data corresponding to a second image line adjacent to said first image line to be transferred to said buffer.

5. The combination in accordance with claim 1 or claim 2 wherein said command includes a delay scaler parameter and wherein said positional parameters in said command specify the movement of said array to a first image line, said combination further comprising:

a control line (SCK); and a buffer memory connected to said array for receiving said particular ones of said pulses in said train of output pulses from said array, said pulses comprising first data corresponding to said first image line;

said third means including clock select means responsive to energization of said control line (SCK) for causing second data corresponding to a second image line adjacent to said first image line to be transferred to said buffer said control line (SCK) being energized after the expiration of a time delay which varies according to the value of said delay-scaler parameter within said command.

6. The combination in accordance with claim 1 wherein said array is equipped with a home limit sensor to sense that said array is in a home limit sensor area corresponding to a mechanical limit of travel in said image plane, wherein said positional parameters in said command provide information to command said array to move to a predetermined offset home limit mechanical position of said array, and, wherein said second means comprises:

a position indicator for generating position representations in response to the physical position of said array, and a servo loop for detenting said array upon the condition that a currently available position representation corresponds to a selected mechanical position of said array specified by said decoded command signals;

means for commanding said servo to detent at its current position;

means for performing initializing operations while said servo is detented at said current position;

means for moving said array to said home limit sensor area to thereby establish a mechanical limit-stop reference position; and, means for moving said array from said limit-stop reference position to said offset home position as indicated by a predetermined position representation of said position indicator.

7. The combination in accordance with claim 1 wherein;

said first means includes a master microprocessor;

said second means includes a slave microprocessor subject to control by said master microprocessor, said second means further includes a position indicator for generating position representations in response to the physical position of said array, and a servo loop for detenting said array upon the condition that a currently available position representation corresponds to said user selected mechanical position of said array specified in said command;

said electronic scan parameters in said command provide information as to a user selected frame size scan output of said array; and, said third means comprises an address counter for generating addresses in response to at least one pulse in said train of output pulses from said array, and a window detector for outputting said train of output pulses upon the condition that a currently addressed output pulse occurs within said user selected frame size specified in said command.

8. The method of scanning an object comprising the steps of:

(a) focusing the object to be scanned at the image focal lane of an imaging lens;

(b) moving an array of light-sensitive devices in the image focal plane of said lens, such that light from the object focused at said image focal plane falls upon said light-sensitive devices, to thereby scan said image thereby generating a train of output pulses from said array;

(c) decoding commands, which commands include mechanical positional parameters and electronic scan parameters, to produce first and second decoded command signals, said positional parameters in said command being qualified by said first decoded command signals and said electronic scan parameters in said command being qualified by said second decoded command signals;

(d) mechanically positioning said array in accordance with said positional parameters in said command as qualified by said first decoded command signals; and, (e) utilizing the output of said array at sequential position intervals of said array with respect to the relative position of said array in the image focal plane of said lens by selectively gating particular ones of said pulses in said train of output pulses from said array in accordance with said electronic scan parameters in said command as qualified by said second decoded command signals.

9. The method in accordance with claim 8 wherein said electronic scan parameters in said command provide information as to a user selected frame size scan output of said array, said method comprising the further steps of:
- (f) generating addresses in response pulses in said train of output pulses from said array; and,
- (g) outputting said train of output pulses upon the condition that a currently addressed output pulse occurs within a user selected frame size specified in said command.

10. The method in accordance with claim 8 or claim 9 wherein said positional parameters in said command provide information as to a user selected mechanical position of said array, said method comprising the further steps of:
- (h) generating position representations in response to the physical position of said array; and,
- (i) detenting said array upon the condition that a currently available position representation corresponds to a user-selected mechanical position of said array specified in said command.

11. The method in accordance with claim 8 or claim 9 wherein said command provides information as to a user commanded reset of said array, said method comprising the further steps of:
- (h) detenting said array at its current position;
- (i) performing initializing operations while said array is detented at said current position;
- (j) moving said array to a home limit sensor area to thereby establish a mechanical limit-stop reference position; and,
- (k) moving said array from said limit-stop reference position to an offset home position as indicated by a predetermined position representation of said position indicator.

12. The method in accordance with claim 8 or claim 9 wherein said positional parameters in said command provide information as to a user selected mechanical position of said array, said method comprising the further steps of:
- (h) incrementally moving said array to a first image line;
- (i) scanning said first image line to produce first data;
- (j) storing said first data in a buffer;
- (k) activating an interface line to notify said user that said first data in said buffer is available;
- (l) moving said array to a second image line; and,
- (m) causing said second image line to be scanned upon the condition that said buffer is empty.

13. The method in accordance with claim 8 or claim 9 wherein said positional parameters in said command provide information as to a user selected mechanical position of said array, said method comprising the further steps of:
- (h) incrementally moving said array to a first image line;
- (i) scanning said first image line to produce first data;
- (j) moving said array to a second image line; and,
- (k) causing said second image line to be scanned after the expiration of a time delay which varies according to the value of a delay-scaler parameter within said command.

14. For use with a scanner which includes a focusing lens for focusing, at the image focal plane of said lens, the image of an object to be scanned;
- an array of the type which scans light-sensitive devices in accordance with a scanning cycle to provide a train of output pulses proportional in magnitude to the light intensity falling upon each successively scanned light-sensitive device;
- means for holding said array in the image plane of said lens, said means including means for allowing movement between said array and said lens such that relative motion between said array and said lens is allowed corresponding to a measured distance in said image plane; and
- means for causing relative motion between said array and said lens;
- a random access controller for controlling access to information within said scanned image, said controller comprising:
- first means for receiving commands, said commands including mechanical positional parameters and electronic scan parameters,
- said first means including means for decoding said commands to produce first and second decoded command signals, said positional parameters in said command being qualified by said first decoded command signals and said electronic scan parameters in said command being qualified by said second decoded command signals;
- second means connected to said first means responsive to said first decoded command signals for mechanically positioning said array in accordance with said positional parameters in said command, said positional parameters in said command being qualified by said first decoded command signals; and,
- third means connected to said first means responsive to said second decoded command signals for selectively gating particular ones of said pulses in said train of output pulses from said array in accordance with electronic scan parameters in said command, said electronic scan parameters in said command being qualified by said second decoded command signals.

* * * * *